(12) United States Patent
Paoluccio

(10) Patent No.: US 8,449,631 B2
(45) Date of Patent: May 28, 2013

(54) METHOD AND APPARATUS FOR BIOMASS TORREFACTION USING CONDUCTION HEATING

(76) Inventor: John A. Paoluccio, Modesto, CA (US)

( * ) Notice: Subject to any disclaimer, the term of this patent is extended or adjusted under 35 U.S.C. 154(b) by 1411 days.

(21) Appl. No.: 12/050,902

(22) Filed: Mar. 18, 2008

(65) Prior Publication Data

US 2008/0223269 A1    Sep. 18, 2008

Related U.S. Application Data

(60) Provisional application No. 60/895,464, filed on Mar. 18, 2007.

(51) Int. Cl.
  *C10L 5/00*  (2006.01)
  *C10L 5/44*  (2006.01)
(52) U.S. Cl.
  USPC .............. 44/605; 44/530; 44/589; 44/590; 44/606; 44/629
(58) Field of Classification Search
  USPC ................... 44/589, 590, 605, 606, 629
  See application file for complete search history.

(56) References Cited

U.S. PATENT DOCUMENTS

| | | | | | |
|---|---|---|---|---|---|
| 2,161,655 | A | * | 6/1939 | Ellis | 162/150 |
| 4,553,978 | A | * | 11/1985 | Yvan | 44/280 |
| 4,787,917 | A | * | 11/1988 | Leclerc de Bussy | 44/606 |
| 2004/0220435 | A1 | * | 11/2004 | Stubbing | 585/242 |
| 2006/0231967 | A1 | * | 10/2006 | Webb | 264/109 |
| 2007/0266623 | A1 | * | 11/2007 | Paoluccio | 44/629 |

* cited by examiner

*Primary Examiner* — Ellen McAvoy
*Assistant Examiner* — Latosha Hines
(74) *Attorney, Agent, or Firm* — Robert S. Smith

(57) ABSTRACT

A method for torrefaction of wood which includes providing a first endless conveyor belt; heating the first endless belt; and positioning a planar wood product on the first belt to heat the wood product by conduction to achieve torrefaction. Other forms provide a second endless belt that disposed in sandwich relation to wood to be torrefied. Some embodiments of the method provide a metal chamber having opposed planar sides dimensioned and configured for receiving a wood sheet with the respective opposed sides of the wood sheet in intimate thermal contact with respective opposed sides of the metal chamber. Other embodiments include the apparatus for torrefaction of an associated wood sheet.

22 Claims, 14 Drawing Sheets

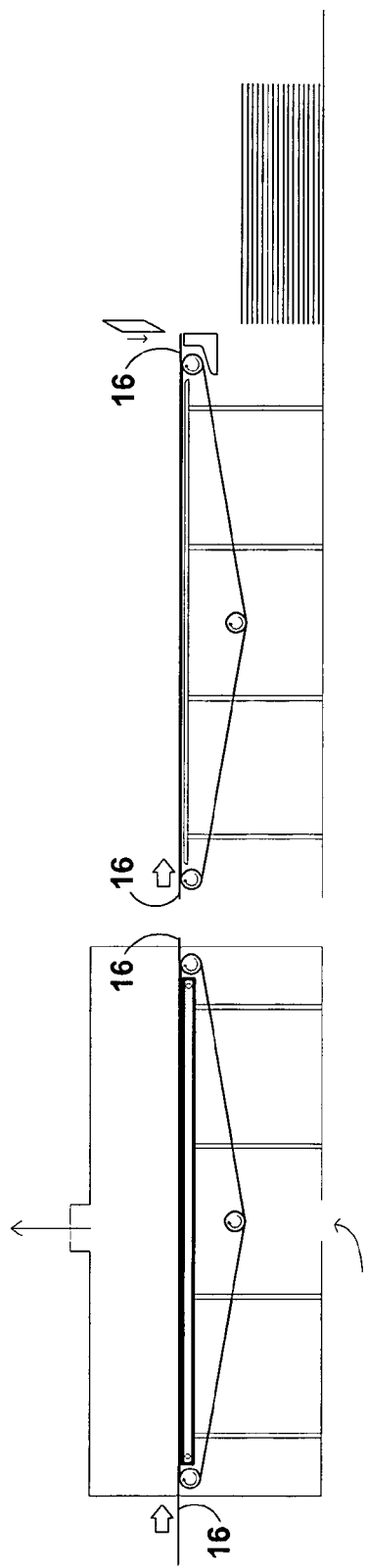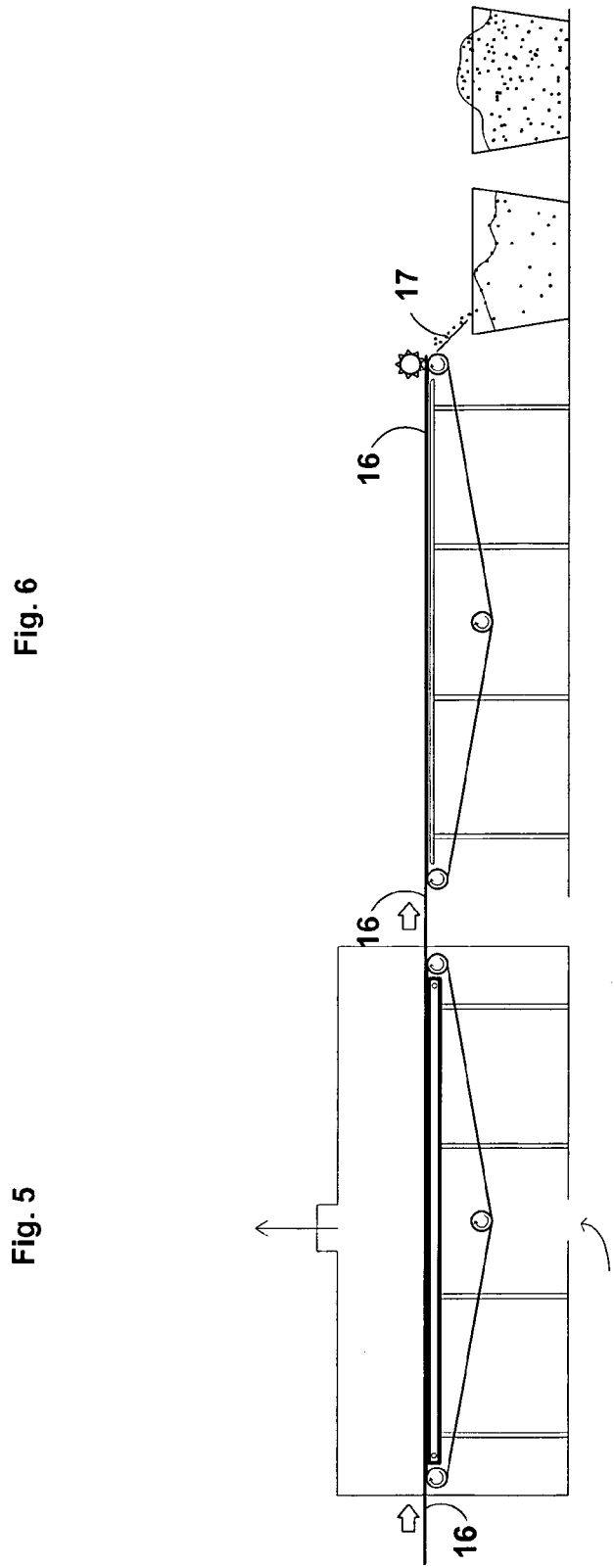

METHOD AND APPARATUS FOR BIOMASS TORREFACTION USING CONDUCTION HEATING

RELATED APPLICATIONS

This application is continuation of provisional application 60/895,464 filed on Mar. 18, 2007 and having the same applicant and title. The apparatus and method of this application also relates to the applicant's prior U.S. application, Ser. No. 11/618,868, filed Dec. 31, 2006 entitled Method and Apparatus for Biomass Torrefaction, Manufacturing a Storable Fuel from Biomass and Producing Offsets for the Combustion Products of Fossil Fuels and a Combustible Article of Manufacture. That application is incorporated by reference herein.

BACKGROUND OF THE INVENTION

The invention relates to methods and apparatus for producing a combustible fuel, torrefaction of biomass, producing carbon dioxide offsets as well as an article of manufacture. The general need and description are included in the patent application above.

The need for a clean burning biomass fuel is of the utmost importance. A more practical or substantially improved method of making torrefied wood could lead to clean electrical power plants burning biomass.

Clean electricity made from carbon neutral biomass could replace over 80 percent of the fossil fuel in use today. At present approximately 40% of fossil fuel is used for electrical generation. Another 40% of fossil fuel is used for transportation due to internal combustion engines.

Over 50 years ago it was envisioned that nuclear electric power generating plants would produce enough clean energy for all electric needs plus energy for electric automobiles and mass transit systems. This was a great vision and someday, new nuclear and fusion energy technologies may be perfected to accomplish this dream. Nuclear plants have encountered too may contamination problems at this time to be considered practical and fusion energy systems may be 200 years away.

The need for an immediate solution to replace our depleting and air polluting fossil fuel energy sources is of the utmost importance. The increase in the use of non-renewable coal and oil requires an immediate replacement fuel to prevent severe economic, health and social problems. One solution is renewable solar energy that replaces the use of coal in electric power generating plants. This approach has not been widely utilized.

Fossil Fuel use for electric power plants, heat energy and transportation is continuing to increase at an alarming rate. Coal fired power plants use most of the coal and produce most of the fossil fuel air pollution. For each ton of carbon burned, 3.67 tons of carbon dioxide is generated. The global use of carbon emissions are over 7 billion tons per year and is expected to reach 14 billion tons per year by 2050.

The concentration of carbon dioxide in our atmosphere has increased over 35% since the late $18^{th}$ century. The level is now at 379 parts per million by volume and climbing. Estimated increases in the last year are alarming.

Many scientists say the only real long term prospect for significantly substituting for fossil fuels is a breakthrough in harvesting solar power.

Over the last 25 years an improved fuel source using wood that has been heated in the absence of oxygen has received considerable attention. This treated wood is called torrefied wood (TW). Numerous attempts have been made to produce this high energy, low pollution fuel with very limited success. Even with all the various methods considered, none has been practical except the prior patent application by this inventor. Even though coal fired electric power plants have found that using some torrefied wood mixed with coal greatly reduces the air pollution generated, the high cost of producing consistent quality torrefied wood simply does not exist with all prior art methods of production.

Wood has been used as a fuel for thousands of years. Wet wood may contain over 50% water. When burned, incomplete combustion occurs and it uses a large portion of its energy to turn the water into steam and produces considerable smoke and thousands of forms of noxious gasses. Dry wood, as used in many fireplaces, may contain approximately 22 percent moisture. For any specific wood being burned, the dryer the wood being burned, the more complete the combustion. Dry wood burns cleaner than wet wood, but incomplete combustion still occurs, resulting in the formation of smoke, carbon monoxide and many volatile organic compounds and other undesirable air polluting gases. The pollution levels produced are unacceptable for most air pollution agencies. Some agencies are banning wood burning but accepting the use of wood pellets in special heaters because wood pellets typically contain less moisture (approximately 10%). However, a substantial amount of volatile organic compounds still exists in very dry wood. When wood pellets formed from dry wood are burned they can generate VOC's and other greenhouse gases.

Carbonized wood is a three thousand year old technology that has been looked at to help replace coal. However, the process is inefficient because, in part, it consumes too much energy. A very promising improvement in technology was developed in the 1980's by the French when they commercially converted wood into torrefied wood. Torrefied wood has most of the moisture and most volatile organic compounds (VOC's) driven out resulting in a high percentage of carbon content. In addition, the chemistry and structure of the wood itself is converted into a new form by continued exposure to heat. The French process used heat treatment by an inert gas to drive out the unwanted moisture and volatile organic compounds and stopped the process before it became carbonized. The torrefied wood burned clean but production costs were high along with a complex system with high potential for fires that prevented this from practical commercial use.

Several inventions since have tried to perfect and improve the torrefaction process by using high pressure steam, high temperature inert gas, superheated steam and other gas, pressure and vacuum methods. Some of these technologies claimed to improve efficiencies but all have failed to overcome the practical conversion of wood into torrefied wood in a simple, easy, quick, practical, safe, uniform and economic way. What these prior technologies accomplished was demonstration projects that showed how using torrefied wood in co-firing with coal could result in cleaner burning with less air pollution generated. Again, all prior art methods, except the prior patent application by this inventor, have been too complex, too expensive, and have not been practical for commercial use.

A number of prior art methods exist for producing torrefied wood. These methods all use inert gas, high pressure steam, or superheated steam in the heat treatment process. These prior art methods primarily use convection heat transfer between the wood surface and the heat source such as a steam or inert gas medium. Using any type of inert gas or steam involves large containment systems with large amounts of surface area, high equipment costs, high energy costs, slow treatment rates, and low overall operating efficiencies with resultant high production costs. Maintaining an oxygen free inert gas environment to these systems adds to the complexity and costs.

With all these prior art methods the systems and equipment has to be complex and large to contain the inert gas or stream heat transfer medium. The high operating pressures required with steam, sometimes over 600 psi, require heavyweight materials for construction of the required equipment and typically utilize batch processes rather than continuous processes. These convection batch systems are inefficient and costly to perform, thus, the final product produced by such convection systems is expensive.

The torrefied wood produced in all prior art methods does not contain the heat transfer fluid (HTF) of this inventors prior patent application. Thus, the heat content is less at about 8,000 to 9,000 Btu per pound.

Even though torrefied wood works extremely well, as a fuel in co-firing with coal to reduce pollution, very little has been produced due to the overall processing inefficiencies and high costs of all prior art systems.

The inventor's recent prior patent application on an immersion method of Torrefaction where wood pellets are immersed in a high temperature heat transfer fluid is an exception and substantial improvement over prior art methods. This method has many advantages but does use some HTF in the process. Where that is not desired, the new, indirect metal conduction to wood process, is a substantial improvement over all prior art.

Torrefied Wood Properties

Torrefaction produces a high quality fuel from wood with a faster combustion rate, less smoking and hydrophobic characteristics. Torrefied wood is very resistant to moisture and decay and is friable. It can be ground and used with coal in co-firing to obtain less air pollution.

Torrefaction of wood, prior art technologies, include convection heating with direct contact with inert gas as the heating medium or indirect contact with steam. Retorts, pressure chambers, kilns and rotary drums are used to contain the wood and inert gas. Temperatures in the range of 240° C. to 280° C. (464 F to 536 F) are typical. Pressures range from atmospheric to high pressure steam at 600 psi or more. Exposure times vary widely and may be 1 to 3 hours. Under high pressure steam with the higher temperatures, the torrefaction time can be reduced to less than an hour. Small wood pieces can be torrefied faster than large pieces.

Temperature considerations inherent in the process include: wood exposed to less than 200° C. (392° F.) result in water evaporation whereby the wood is dehydrated. Little or no combustible products are formed. Therefore, using a heat transfer conduction at a temperature of approximately 350° F. is reasonable for pre-heating the wood, in a manner that prevent combustion from occurring, before the wood enters the heat treatment section 14.

When wood is heated to 160° C. (320° F.) it loses water and very little else. It also retains its physical mechanical properties and remains hygroscopic. When wood is exposed to 180° C. to 280° C. (or 355° F. to 536° F.) it gives off moisture, carbon dioxide, and large amounts of acetic acid and VOC's. Complex endothermic reactions occur during this 355° F. to 536° F. heating period along with changes to the physical and chemical properties include the wood becoming more friable and hydrophobic. Torrefaction is achieved during this high temperature heating process where the moisture content is reduced to 3% or less, the mass is reduced by approximately 30%, retention of 90% of the original energy and removal of most smoke producing agents. These temperatures, moisture removal percentage and exposure times vary with the type and density of biomass material being torrefied.

When wood is heated to above 280° C. (or 536° F.) the reactions become exothermic and the wood starts to be gasified instead of being torrefied. When gasification occurs the wood is transformed into combustible gasses including methane, carbon monoxide, hydrogen and tars. Wood is gasified for certain purposes but this is not desired for torrefaction as described herein.

Prior art temperatures of 250° C. to 270° C. (482° F.-518° F.) are the standard with "convection" heating". The higher the temperature the faster the wood is torrefied. Smaller particles, such as pellets, can be torrefied faster than large particles such as briquettes.

Switchgrass

General Information on One Potential Energy Crop

Almost any biomass can be used as a fuel source; however, switchgrass has many advantages that make it an ideal material to consider with this invention.

Switchgrass stands about 10 feet tall and grows in most areas. It needs little water and can produce over 10 tons of dry biomass fuel per acre. Switchgrass can produce 185 GJ (175.5 MBtu or 175,000,000 Btu) of energy per 10 tons of biomass. Each acre of even marginal crop producing value can produce an average of 10 tons of switchgrass. Switchgrass has an energy output to input ratio of approximately 20:1. This makes it one of the highest net energy yields of any other practical biomass per acre. Switchgrass can be repetitively harvested over 10 years before re-planting is necessary. One third of the carbon dioxide collected by the plant is sequestered back into the soil by its root system that remains after harvesting. When switchgrass is used as a pelleting material in existing mills a doubling of production occurs over hardwood and softwood sawdust.

Currently, state of the art switchgrass pellets have a very high net energy yield per acre as compared to other biomass forms. It has the highest energy output to input ratios, the greatest economic advantage over fossil fuels and the greatest potential to offset carbon dioxide from fossil fuels. When switchgrass pellets are substantially improved with this unique direct conduction torrefaction process and method of this invention, hereinafter referred to as "torrefied wood pellets" (TWP), they becomes a practical replacement or supplement for fossil fuel such as coal for use in electric power plants. Co-firing 15% torrefied wood pellets (TWP) to 85% coal has been successfully tested in a number of electric power plants that resulted in significant pollution reduction.

BRIEF DESCRIPTION OF THE DRAWINGS

The invention will be better understood by reference to the accompanying drawings in which:

FIG. 5 is a schematic elevation view of a further cooling section that is positioned sequentially after the cooling section illustrated in FIG. 4 whereby the TWS leaving the cooling section is further air cooled with fans.

FIG. 6 is a schematic elevation view of a cutting station positioned sequentially after the air cools section illustrated in FIG. 5 where the TWS is cut in 4 foot by 8 foot long sheets ¼ inch thick and stacked for storage or use.

FIG. 7 is a schematic elevation of view of apparatus that is an alternate to the air cool section illustrated in FIG. 5 as well as the cutting station illustrated in FIG. 6 in which the TWS is cut into small pellets by a cutter blade.

SUMMARY OF THE INVENTION

Advantages of the Invention

Figure 1:
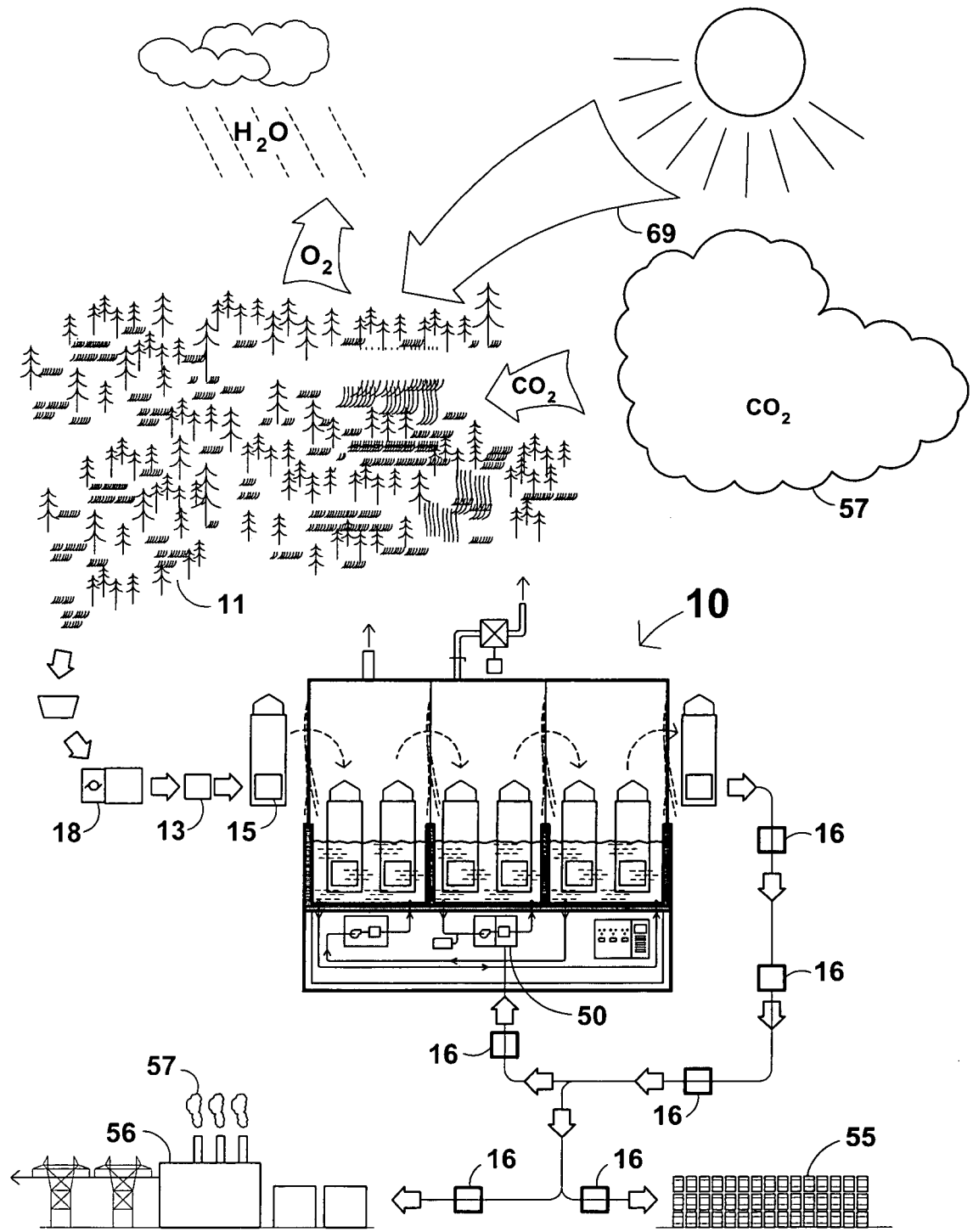
FIG. 1 is a diagrammatic view of the sequential steps in processing wood to the ultimate utilization at electric power plants; the heater for this process; or storage facilities to be used as energy and pollution "offsets".

Various embodiments of the invention have some or all of the following advantages. A paramount advantage is the creation of a new and improved type of renewable energy fuel called torrefied wood sheets TWS or torrefied wood pellets (TWP) made from treating wood into sheets and cutting the sheets into pellets to replace or supplement non-renewable fossil fuel such as coal in order to reduce air pollution. The present invention turns wood into a torrefied form that is a near pollution free fuel with high carbon content that can withstand decay and decomposition from moisture, insects and microbes and can be easily transported and stored for hundreds of years as carbon offsets.

The present invention finally allows for the safe, economical, practical production of turning wood into torrefied wood pellets TWP or sheets TWS for use as a fuel and for energy or pollution "Offsets". For greatest efficiency, the biomass should be collected, air dried and prepared into a pulp form so it can be pressed into a roll of sheet material similar to existing technology in making composition wood sheets that are 4'×8'×¼" or thicker. The process for forming the pulp into sheets may be done by hydraulic presses, multiple roller presses or other existing technology pressing means before it enters the processing portion of the facility as described in this invention. The ideal forms of treated wood biomass will be 4'×8'×¼" sheets if used as carbon "Off-Sets" or ¼"×¼"× 1" wood pellets if used as a fuel. Processing the wood pulp and pressing it into dense thin sheets is ideal for uniformity of finished TWS, higher heat content per pound, less volume with higher density are all preferred for continuous flow heat treatment operations.

The indirect conduction heat treatment as described in this invention can use biomass that has been collected, turned into a pulp and press formed into sheets by any existing technology means. It can then be converted into torrefied wood sheets or torrefied wood pellets in accordance with the present invention.

The following list some of the many benefits and advantages:

1. Waste wood and other normally unused biomass could be put to a practical use instead of being placed in landfills or incinerated or left to decay where it returns carbon dioxide, methane and other gasses to our air.
2. Farmers could put to use large areas of near worthless land and restore it to grow energy biomass crops for energy production.
3. Switchgrass may be one of the most energy efficient biomass crops to grow for energy use. It may produce 2 to 3 times the energy of corn.
4. New industries could be formed to harvest, collect, transport, chip, shred, mill and press into sheets for production into the torrefied wood products in accordance with the present invention.
5. Millions of jobs could be generated throughout the world to man the growing, harvesting, collecting, transporting, milling, pressing, processing, distributing, managing and storage of torrefied wood products in accordance with the present invention for energy use and offsets.
6. The air we breathe would benefit from every pound of torrefied wood produced. When the goal of total carbon "off-set" is achieved, in replacing fossil fuel, the concentration of carbon dioxide may stop increasing and actually start to decrease to a normal "natural" level of concentration. Then the level could be lowered to a more natural concentration level as in the past, 1800s.
7. The health of all life including people, animals, fish and plants would improve with a shift toward normalization of the carbon dioxide concentration level. Many other harmful fossil fuel gases and pollutants would also be eliminated from the environment along with "zero" added carbon dioxide due to "Renewable Energy" torrefied wood use as a side benefit.
8. Acid rain will be diminished, as coal use is diminished, as it causes crops and forests to die and causes lakes to turn baron of life.
9. Poor developing nations can utilize the teachings of this invention to move forward with modernizations and offset the greenhouse gases they produce. Health problems of catastrophic proportion are occurring in many developing nations due to burning poor quality fossil fuels. The teachings of this invention would assist them in being better stewards of the land and move toward cleaner fuels and "Off-Sets" to replace fossil fuel use.
10. Recent air quality sampling tests conducted in multiple stations in California revealed that up to 25% of the air pollution can be traced to China and other overseas countries. The teachings of this invention can help these countries generate clean heat and energy and help curb global air pollution.
11. The health of all nations would improve in many ways. Science and the medical profession know very little about the long range effect of air pollution on living tissue. The term air pollution in this case refers to all the smoke, gases, dust, pollen, etc. that is frequently referred to as smog. They do know that certain debilitating medical problems result from long term exposure but the combination of pollutants is so complex that the long range impact to health is not very well known. What is known is that it is safer to avoid unnecessary exposure to these unnatural fossil fuel contaminants.
12. This invention can result in a tremendous increase in plant growth for specific production of biomass for the production of torrefied wood products in accordance with the present invention. Some nations may contract with the USA and other nations to grow certain crops, harvest it, and process it into torrefied wood products in accordance with the present invention for fuel or offsets. Some nations that grow plants for producing illegal drugs may instead grow plants for producing biomass for fuel in the form of torrefied wood products in accordance with the present invention. Society would benefit.
13. This invention would require more cropland, forests and plant growth. This would bring with it a resurgence of wildlife and natural habitats where endangered species could prosper. Many underdeveloped nations have decimated their woodlands by clear cutting, burning for conversion to farming and used most for fuel. The teachings of this invention can help restore these nations' forests and woodlands.
14. As more plants are grown, the carbon dioxide level will decrease. Plants act as air and water filters and extract harmful chemicals during growth. This invention alters our environment more toward a natural previous state.
15. Existing factories and industries that still use fossil fuels can apply for energy or pollution "offsets" when they plan on expanding their facility. The torrefied wood products in accordance with the present invention become a very practical means of allowing these facilities to expand and reduce the net amount of carbon dioxide entering our air. For example, a factory that needs to offset a certain value (X) of carbon equivalent offsets could purchase (X) amount of torrefied wood products in accordance with the present invention for long range storage. The added energy they would use in their expansion would equal the energy in the (X) amount of offsets purchased. In essence, for every pound of "Carbon" stored as an offset in the torrefied wood products in accordance with the present invention would equal one pound or "carbon" used in the fossil fuel burned, resulting in "Zero" net added pollution.
16. This invention provides the world with the only immediate practical solution to a clean energy fuel to replace fossil fuel coal on a large scale. If, for example torrefied wood pellets (TWP) were to replace only 1% of the coal used each year in existing electric power plants, the torrefied wood products in accordance with the present invention used would cover an area the size of a football field and be 4 miles high! Currently, over 7 billion tons of fossil fuel is burned each year. It is very difficult to comprehend the volume of carbon dioxide produced by its combustion.
17. Circulating a high temperature heat transfer fluid through a plate heater allows for simple indirect "conduction" heat treatment of the wood in direct contact with the outer metal surface of the plate heater. The HTF never comes in contact with the wood in this invention, unlike my previously submitted invention. Direct conduction of the wood in contact with the hot metal surface results in rapid heat transfer in order to quickly convert it to torrefied wood. The treatment time may be reduced to minutes instead of hours as with prior art "Convection" heating methods.
18. Indirect heat conduction of metal to wood or even heated conveyor belt to wood results in considerably faster heat transfer to occur as compared to inert gas or steam as in many prior art systems.
19. The need for special and expensive oxygen free gases to be supplied to the heat treatment section is virtually eliminated due to the unique slot exhaust system located on the edges of the conveyor belts.
20. The first costs, operating costs and total production costs of the entire equipment of this invention is a mere fraction of those of prior art. Therefore, torrefied wood sheets or pellets (TWP) can be produced at such low cost as to make its use extremely practical as a replacement or supplement to coal. The primary barrier to the practical use of torrefied wood pellets (TWP) in co-firing with coal has been the high cost and quality of torrefied wood pellets (TWP) production and this invention solves these problems.
21. As the teachings of this invention become known, new agricultural, and genetic practices should lead to the development of energy crops that like switchgrass will yield more energy per acre and have improved properties for processing into torrefied wood. Biomass from the sea has the potential to provide massive amounts of feedstock and may satisfy the supply needs as solid biomass fuel replaces coal in the long term.
22. The USA and the rest of the world will reduce its dependence on fossil fuels.
23. High quality fossil fuels are diminishing at a rapid rate. This invention can greatly extend existing supplies for future generations.
24. Coal is used more than any other fossil fuel. In addition, most coal is not of high quality. Desired coal has a high carbon content, low sulfur and low heavy metal content. This higher quality coal is becoming more difficult to find. More use of lower quality coal is being used and this requires more complex and costly air pollution controls. This invention can greatly reduce the use of the low quality coal.
25. Gasification potential. As fossil fuels become scarce and more costly, biomass is being used more for gasification to produce efficient heating and electric power generation. One of the major problems with gasification projects has been the non-uniform feedstock used resulting in poor quality control and inefficiency. TWP can provide a very uniform, high energy content fuel feedstock that could make gasification projects very efficient and practical.
26. Small electric power generators using practical and efficient gasification with TWP would allow small factories, schools, hospitals and other facilities to be independent from the electric grid by generating their own electricity and power.
27. Transportation potential. The concentrated energy in TWP has potential for very small scale power generation such as a solid fuel powered vehicle. Using the waste heat of combustion, similar to my previous U.S. Pat. No. 4,616,620, where the exhaust gases were used to regenerate a desiccant drier material, could be used in a gasification process where the gas could power an engine. Instead of gasoline a tank of TWP would be the fuel.

It has now been found that the objects and advantages of the present invention may be achieved in a method for torrefaction of wood which includes providing a first endless conveyor belt and apparatus for mounting the first endless belt on respective rollers; heating the first endless belt; and positioning a planar wood product on the first belt to heat the wood product by conduction to achieve torrefaction.

The method may further providing a second endless belt; heating the second endless belt; positioning at least a first axial portion of the second belt proximate to at least a first axial portion of the first endless belt, whereby a wood product may be moved intermediate the respective first axial portions to achieve torrefaction of the wood. The step of providing a conveyor belt may specifically be the step of providing a metal conveyor belt to maximize heat transfer The method may further include providing first and second opposed metal conveyor belts dimensioned and configured to simultaneously contact opposed sides of the wood product to maximize heat transfer.

Some embodiments sequentially provide pre-heat, heating and cooling sections for sequentially heating and cooling a wood product. The steps may further include providing a subsequent cutting section disposed after the cooling section. The step of providing a cutting section that may include providing a cutting station that includes a cutting station for cutting sequential transverse sections of a planar wood product or a cutting section that cuts both sequential transverse sections of a planar wood product as well as axial parts of each transverse section to produce pellets.

The step of providing a first endless conveyor belt may include providing a belt that has axially extending edges that are not uniform whereby gasses escaping from a planar wood product may pass more easily. The method may further include providing an enclosure having an outlet surrounding the first and second opposed metal conveyor belts dimensioned and configured to contact opposed sides of the wood product whereby the gasses escaping from the heated wood product can be directed from the wood product.

Some embodiments of the method include the step of providing apparatus to form wood pulp into sheets proximate to the endless belt. Some embodiments include the step of providing an exhaust conduit having an exterior contour dimensioned and configured to snugly engage a space intermediate opposed conveyor belts that are positioned for heat transfer relationship with opposed sides of single wood sheets.

Various embodiments may include the step of heating the first endless belt to thereby heat the wood product is achieved by heating the endless belt to a temperature in excess of 450° F. or 480° F. In some cases the method includes the step of heating the first endless belt is sufficient to heat the wood to a temperature of 480° F.

Some embodiments of the method for torrefaction of wood which includes providing a wood sheet having opposed generally planar substantially parallel opposed sides; providing a metal chamber having opposed planar sides dimensioned and configured for receiving the wood sheet with the respective opposed sides of the wood sheet in intimate thermal contact heat transfer relationship with respective opposed sides of the metal chamber when the wood is placed in the metal chamber; positioning the wood sheet within the metal chamber with intimate thermal contact between the planar sided of the wood and the respective opposed planar sides of the metal container; immersing the metal chamber in a heat exchange liquid: and heating the wood by conduction heat transfer between the metal chamber and the wood sheet to a temperature of at least 400° F.

The method may further including the step of providing an ejection structure for removing the wood sheet from the metal chamber. Other embodiments further include providing a plurality of additional wood sheets having opposed generally planar substantially parallel opposed sides; providing a respective metal chambers for each of the plurality of additional wood sheets each having opposed planar sides dimensioned and configured for receiving the wood sheet with the respective opposed sides of the wood sheet in intimate thermal contact heat transfer relationship with respective opposed sides of the metal chamber when the wood is placed in the metal chamber; positioning each additional wood sheet within a respective metal chamber with intimate thermal contact between the planar sides of each of the wood sheets and the opposed planar sides of a respective metal container; immersing the metal chamber in a heat exchange liquid: and heating the wood by conduction heat transfer between the metal chamber and the wood sheet to a temperature of at least 400° F.

Some forms of the method further include providing a rack for receiving a plurality of metal chambers as well as providing clamping apparatus for clamping the plurality of metal chambers together and clamping the plurality of metal chambers within a rack together. The method may further include positioning spacers intermediate adjacent metal chambers before the clamping step.

Other forms of the include apparatus for torrefaction of an associated wood sheet having opposed first and second planar faces which includes a first endless belt and respective rollers for mounting the first endless belt; heating apparatus disposed for heating at least an axial portion of the first endless belt; and the first endless belt is dimensioned and configured for planar face to face engagement for conductive heat transfer between the first and last belt and a first face of the associated would sheet.

The apparatus may further include a second endless belt and respective rollers for mounting the second endless belt; heating apparatus disposed for heating at least an axial portion of the second endless belt; the second endless belt having at least a first axial portion of the second belt proximate to at least a first axial portion of the first endless belt, whereby a wood product may be moved intermediate the respective first axial portions to achieve torrefaction of the wood; and the second endless belt being dimensioning configured for plane are faced to face engagement with the second face of the associated wood sheet simultaneously with planar face to face engagement for conductive heat transfer between the first belt and a first face of the associated wood sheet.

The apparatus may include sequential pre-heat, heating and cooling sections and the first and second endless belts are disposed in the heating section as well as a cutting section that cuts sequential transverse sections of a planar wood sheet following the cooling sections. The apparatus may further include apparatus for forming wood pulp proximate to the first endless belt or an exhaust structure engaging the first and second endless belts.

Description of the Preferred Embodiments

The overall apparatus and method will best be understood by the following more detailed description of the drawing.

Figure 2:
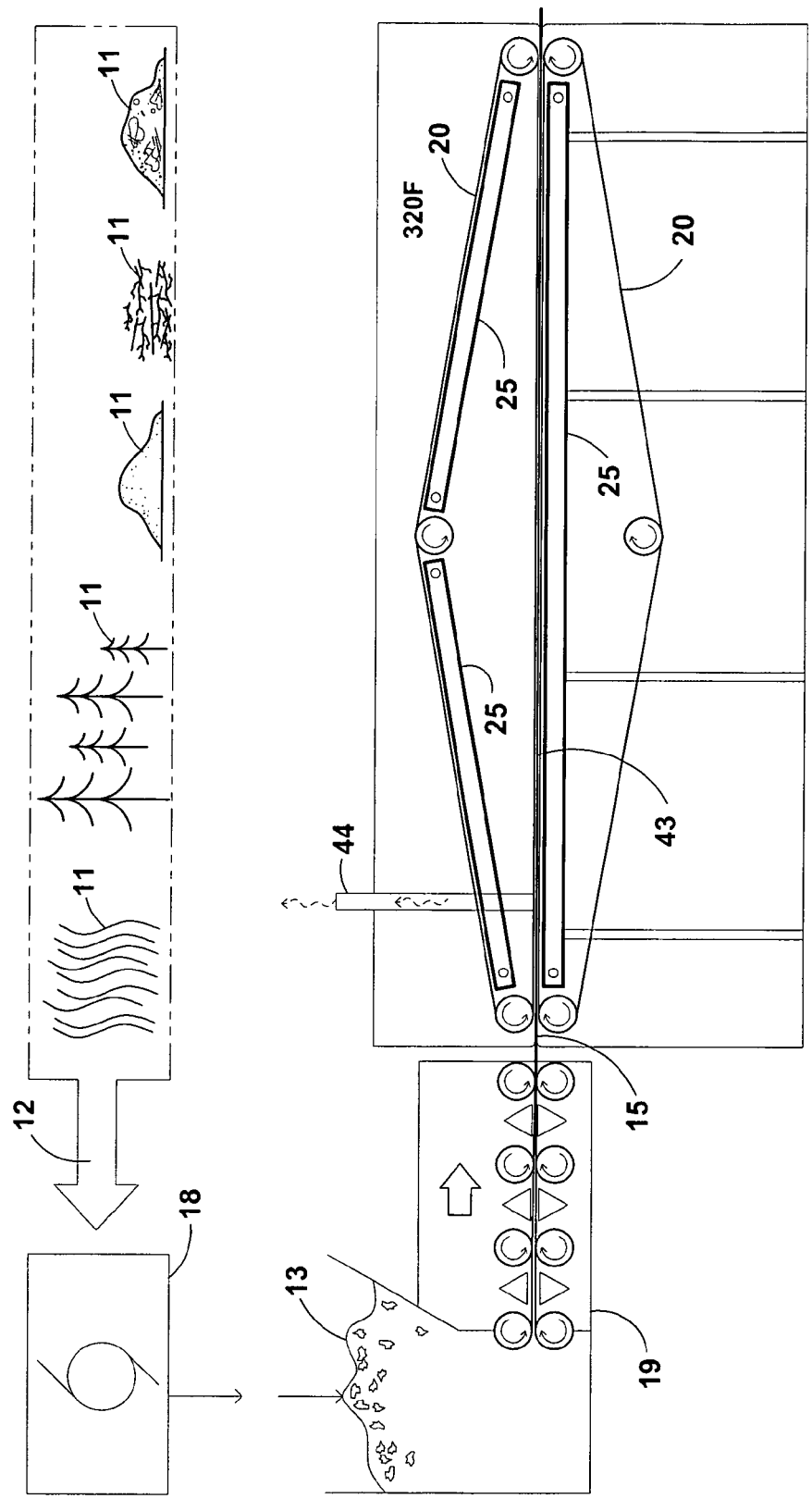
FIG. 2 is a schematic elevation view of the pre-heat section a first preferred embodiment of the direct conduction heat treatment system for producing torrefied wood.

Referring now to FIGS. 1 and 2 there is shown a diagrammatic view of the path wood 13 would travel from biomass to a mill operation where the wood is turned into a pulp for densification into a sheet such as composition wood. The pulp wood 13 is formed into sheet stock 15 from roller presses or hydraulic presses 18 using existing technology. The wood sheet then enters the conduction heat process in accordance with the present invention where the wood is converted to torrefied wood sheets (TWS) 16. The sheets 16 may be further cut into pellets (TWP). The fully processed torrefied wood pellets (TWP) are diagrammatically illustrated as being distributed to electric power plants 56; to the heater 50 for this process; and to storage facilities 55 to be used as energy and pollution "offsets".

The schematic elevation view of one form of the direct conduction heat treatment system for producing torrefied wood is shown in FIG. 2. This section shows the wood pulp 13 being rolled into a sheet 15 such as composition wood. The rollers or press 18 may compress the wood pulp 13 into a long sheet that may be 1/14" thick by 4 foot wide. The sheet is shown being conveyed by two heated conveyor belts that sandwich the sheet and heat the sheet while moving it. This heating section is the pre-heat section in which the sheets are heated to 320 F whereby almost all the moisture is driven out of the wood sheet. The conveyor belt may be metal and may be heated by a hot metal table that has a_thin surface that is the part of a tank that contains a heating fluid such as steam or heat transfer fluid that is in a closed system. No heat transfer fluid comes in contact with the wood sheet. Only heat energy is transferred to the conveyor belt and then transferred to the wood sheet. The heat energy drives out the moisture in the wood pulp sheet in the pre-heat section. The companion conveyor belt above the sheet may be heated with plate heaters.

Figure 3:
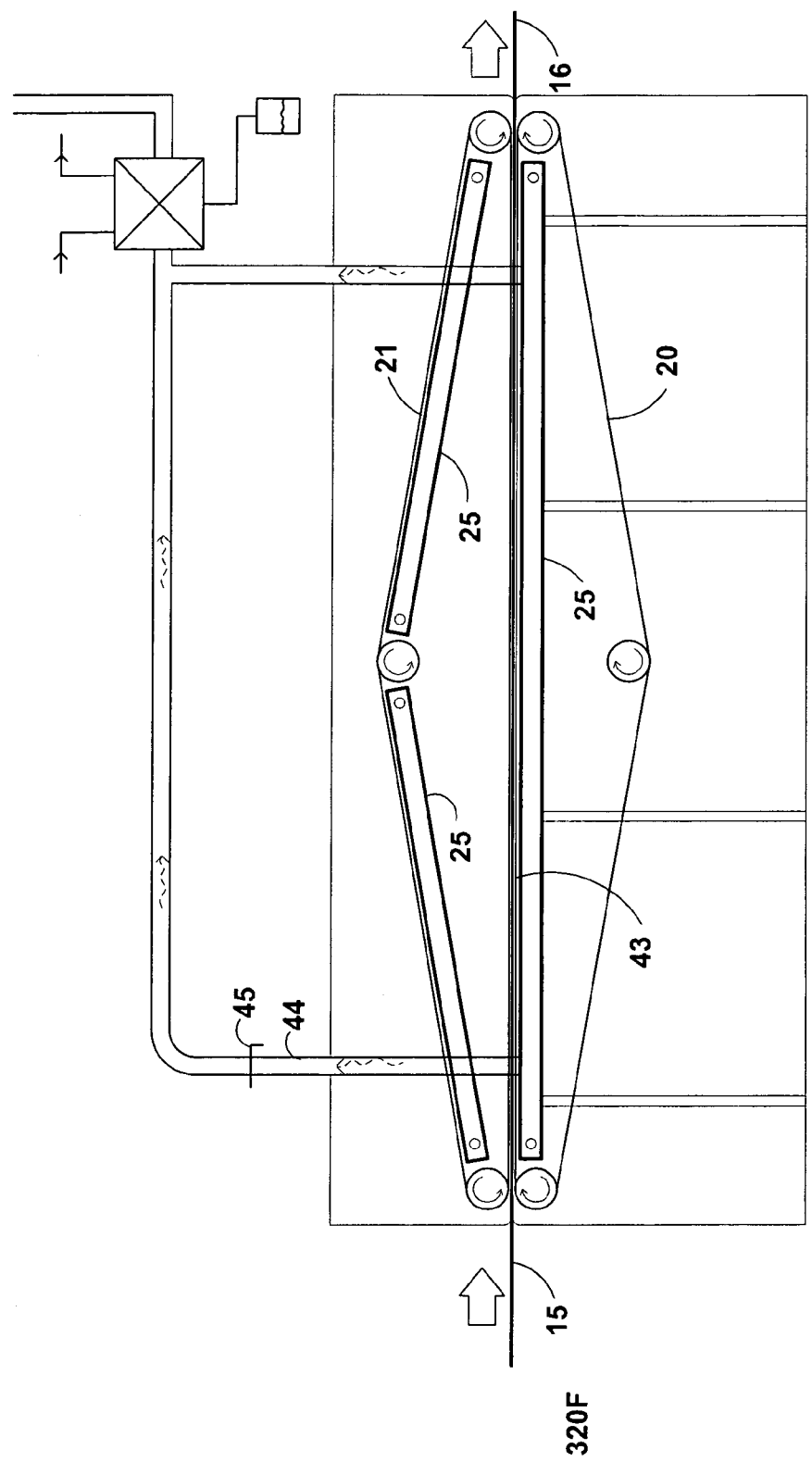
FIG. 3 is a schematic elevation view of the heat treatment section of the apparatus that is positioned sequentially after the pre-heat section illustrated in FIG. 2.

Referring now to FIG. 3 there is shown a schematic elevation view of the heat treatment section where the wood sheet is heated up to 480 F. This section is enclosed in a chamber that is oxygen free to prevent combustion. The conveyor belts are heated in a similar fashion to the pre-heat section, except heated to a much higher temperature that may be 540 F. The conduction heat from the belt to the wood sheet drives out the volatile organic compounds (VOC's). Heat energy is also used to transform the wood sheet into torrefied wood by endothermic reaction. During this phase, the wood takes in heat energy and transforms the wood chemistry and structure into torrefied wood.

Figure 4:
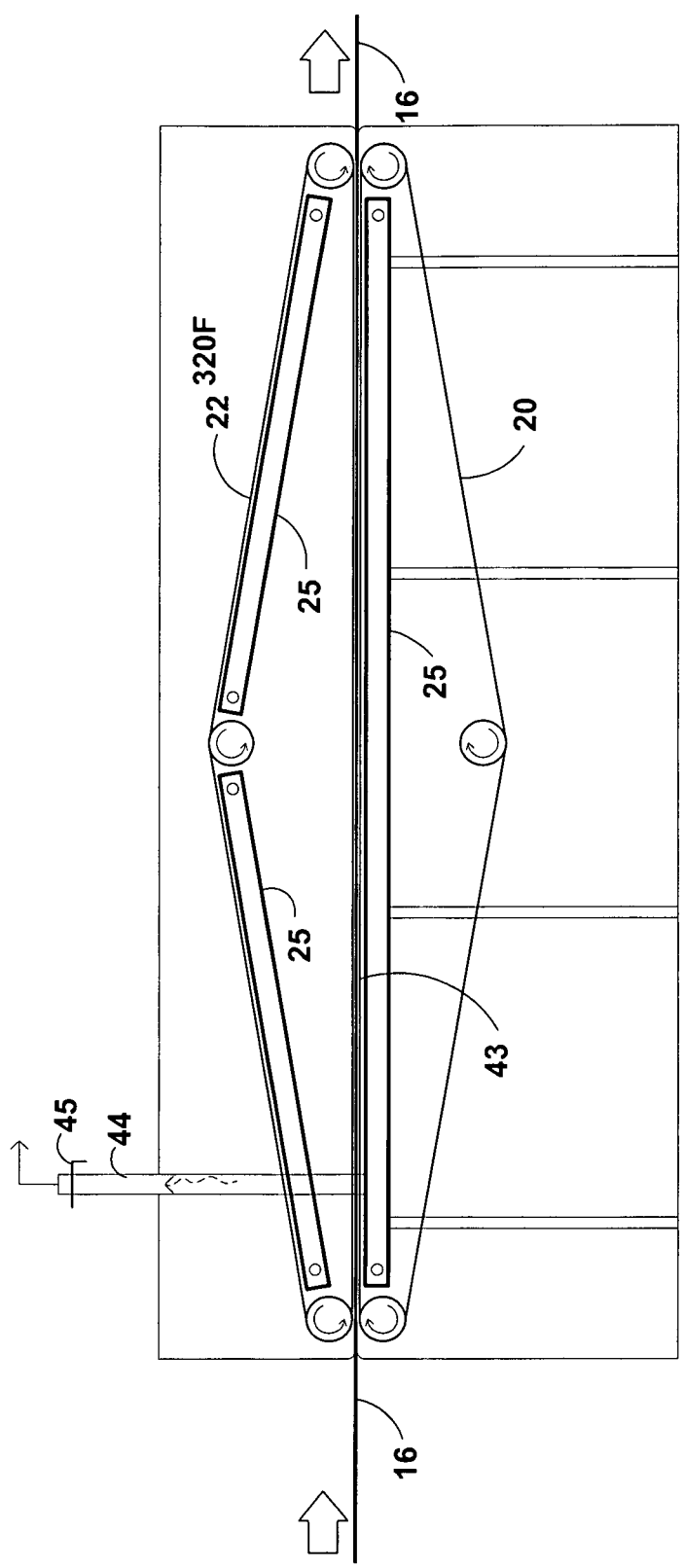
FIG. 4 is a schematic elevation view of the cooling section that is sequentially positioned after the heat treatment section illustrated in FIG. 3.

FIG. 4 is a schematic elevation view of the cooling section that cools the torrefied wood sheets TWS from 480 F to 320 F. In some embodiments the heat table and plate heaters may transfer heated fluid to the pre-heat section for reclaiming energy back and forth between the cooling and pre-heat sections.

FIG. 5 schematically shows the TWS leaving the cooling section and being further air cooled with fans. More specifically, the fans direct relatively cool air through perforated conveyor belts 22 through which ambient air is directed to cool the TWS as shown in FIG. 5. This air is warmed in the process and may be used to preheat other wood entering the process in accordance with the present invention. Alternatively, the belt 22 may cooperate with a plate heat exchanger 25 as shown in FIG. 4.

Figure 10:
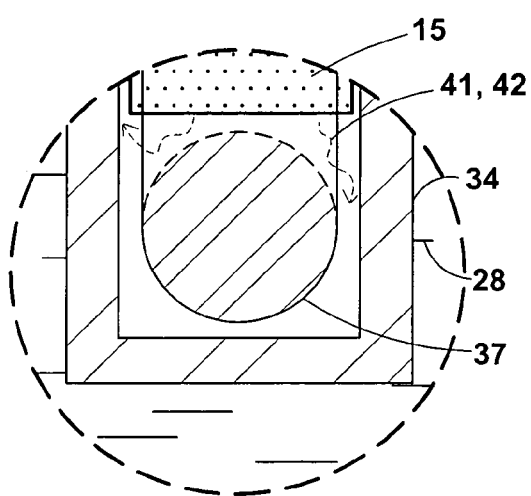
FIG. 10 is a schematic enlarged view of the internal bottom of the metal chamber that shows a wood sheet and a formed metal rod that lifts out for removing the wood sheet.

FIG. 6 shows the TWS being cut in 4 foot by 8 foot long sheets 1/4 inch thick and stacked for storage or use and FIG. 7 shows an option where the TWS are cut into small pellets by a cutter blade. The small cut pieces may be 1/4"×1/4" by 3/4" long. These are shown being put in carts for storage or use. Where flat TWS wood sheets are used in immersion plate housings, as shown in FIG. 10 the cut size may be 2'×2'×1/4" or any other desired size.

Figure 8:
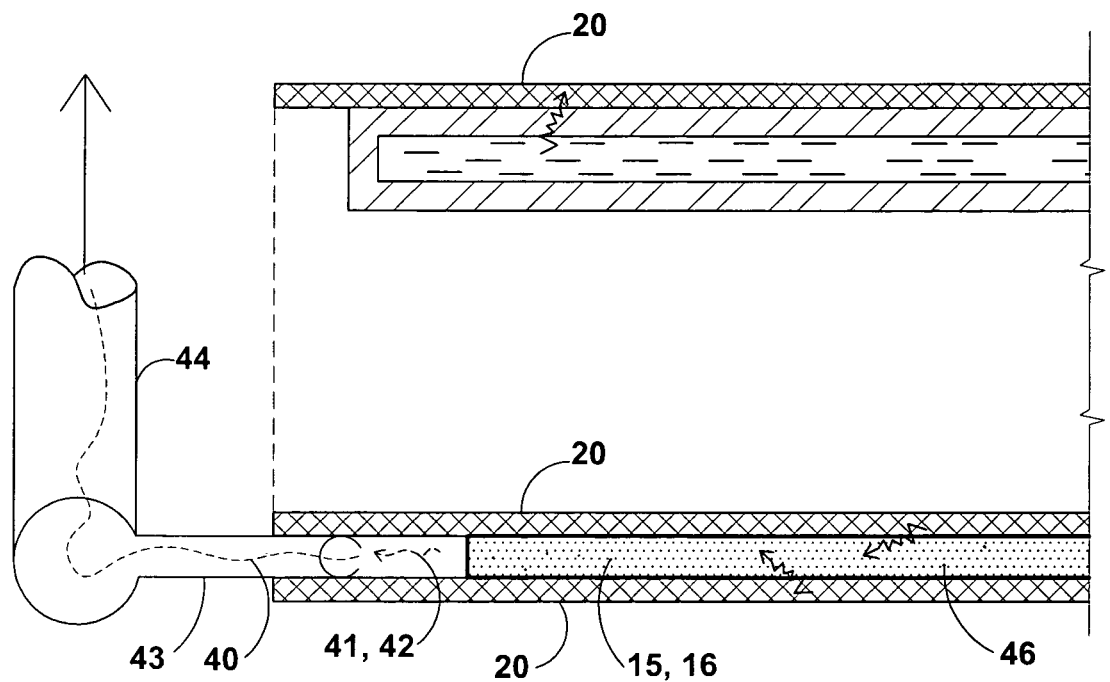
FIG. 8 is an enlarged cross-sectional view of the edge of the wood sheet between two heating belts and illustrating an inlet having an inlet dimensioned and configured to be inserted intermediate opposed belts to capture gases escaping from the wood product being heated and thereby displace oxygen away from the wood product to prevent combustion.

FIG. 8 is an enlarged cross-sectional view of the edge of the wood sheet between two heating belts 20, 20 where the heat energy applied to the wood drives moisture in the form of steam or VOC's are driven out of the wood and exit the side by way of a conduit to an exhaust system.

Figure 9:
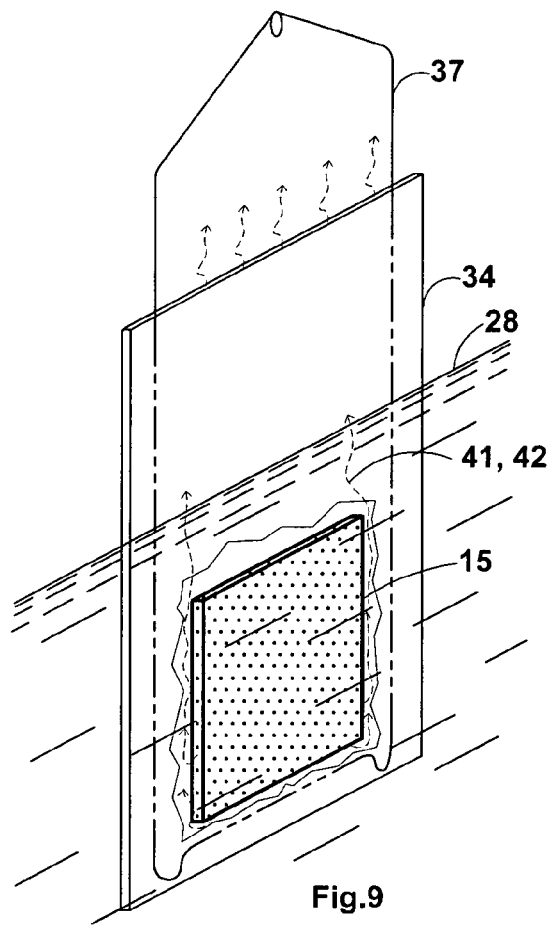
FIG. 9 is a schematic view of a second preferred embodiment in which a wood sheet is heated inside a thin metal chamber being heated by direct conduction.
Figure 11:
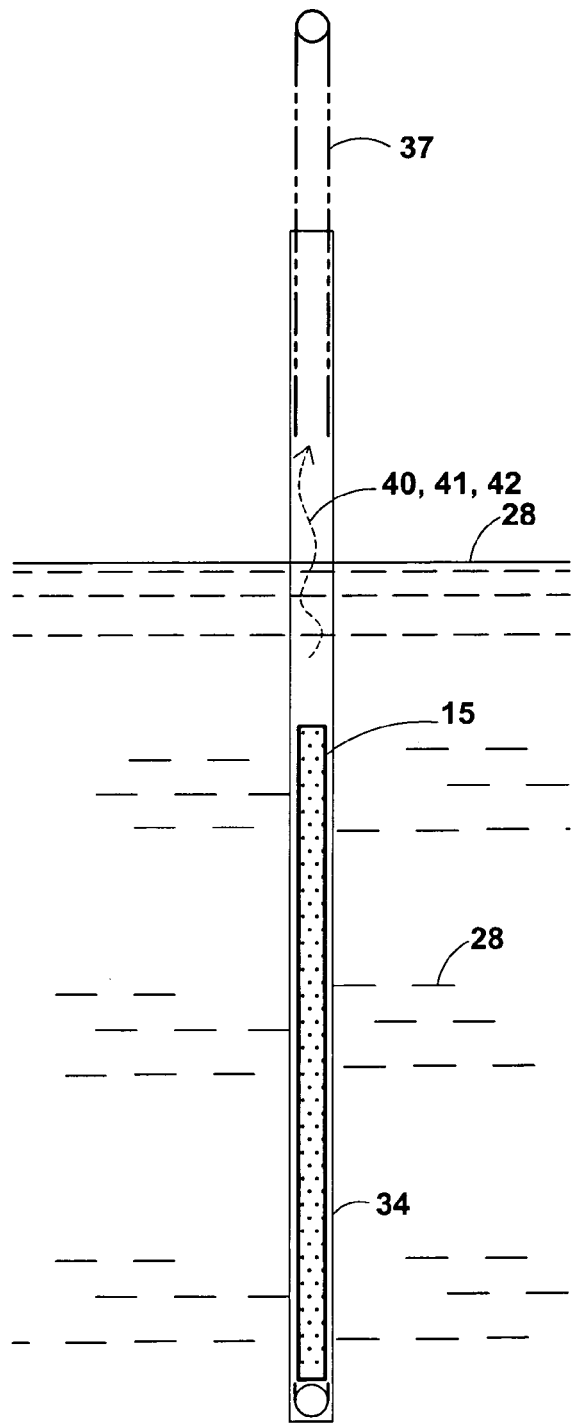
FIG. 11 is a schematic elevation view that shows the metal chamber with wood sheet partially submerged in a vat of heat transfer fluid.

FIG. 9 is a schematic view of a second preferred embodiment of the present invention in which a wood sheet is heated inside a thin metal chamber being heated by direct conduction. In this preferred embodiment utilizes a wood sheet having a 2'×2'×1/4" size that is positioned inside a thin metal chamber 34 that in one preferred embodiment is 3' wide×5' high×1/4" inside depth with an open top. The wood sheet 15 is thus indirectly heated by direct conduction heat transfer to the chamber 34. The steam and VOC's are being shown driven out by the heat energy. FIG. 10 is a schematic enlarged view of the internal bottom of the metal chamber 34 that shows a wood sheet 15 and a formed metal rod 37 that enables a user to remove the wood sheet 15 from the metal chamber 34. FIG. 11 is a schematic elevation view that shows the metal chamber 34 with a wood sheet partially submerged in a vat of heat transfer fluid.

Figure 12:
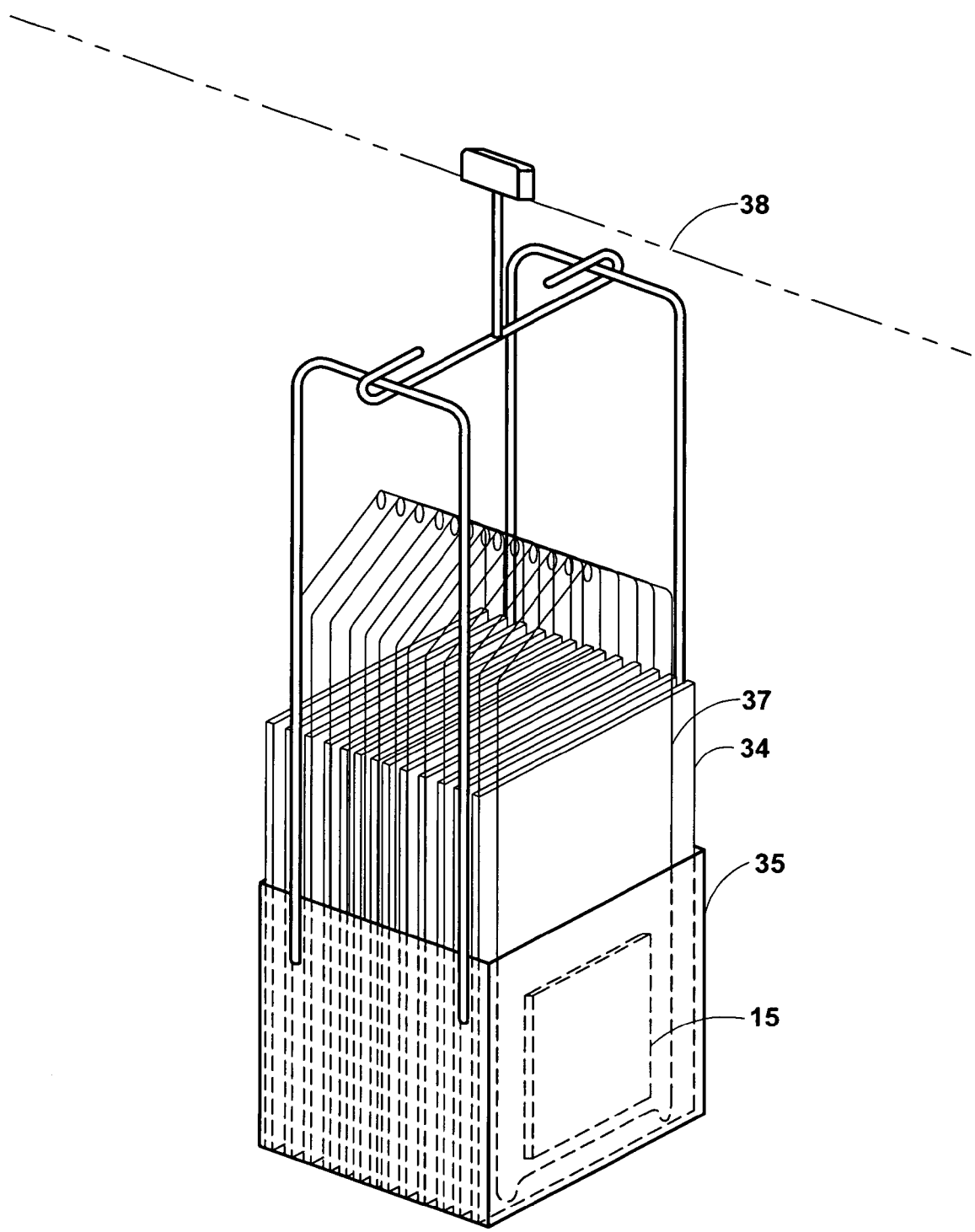
FIG. 12 is a schematic isometric view of multiple thin metal chambers in a rack with wood sheets in each chamber.
Figure 19:
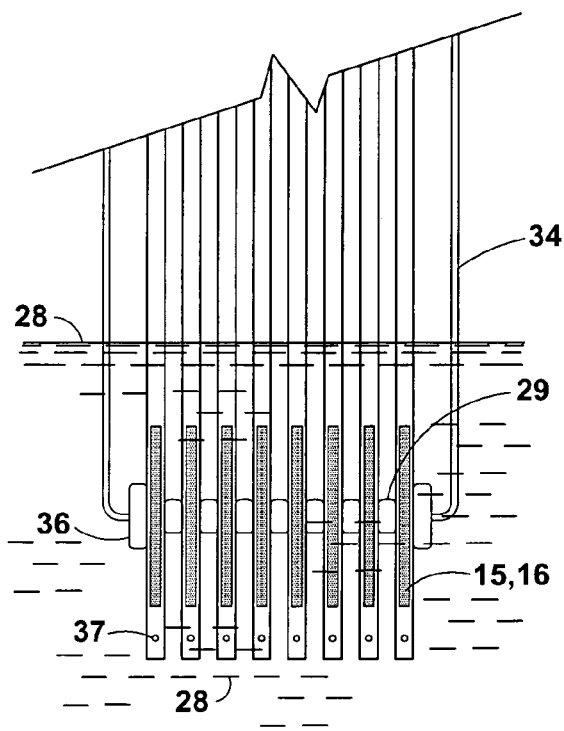
FIG. 19 is a partial elevation view of the rack and chambers that show spacers between adjacent chambers.

FIG. 12 is a schematic isometric view of multiple thin metal chambers in a rack with wood sheets 15 in each chamber 34. As best seen in FIG. 19 a narrow spacer 29 is disposed between adjacent chambers 34 and a clamp presses all the chambers and spacers together for a tight heat transfer conduction fit during the heating process in which the wood shrinks slightly. The spacers 29 act to maintain the chambers 34 in spaced relation to allow the heat transfer fluid to circulate around the lower portion of each chamber 34 in the rack 35. This method provides for substantial surface area contact for ideal conduction heating while the wood sheets shrink slightly. The rack is also shown attached to the conveyor system 38.

Figure 13:
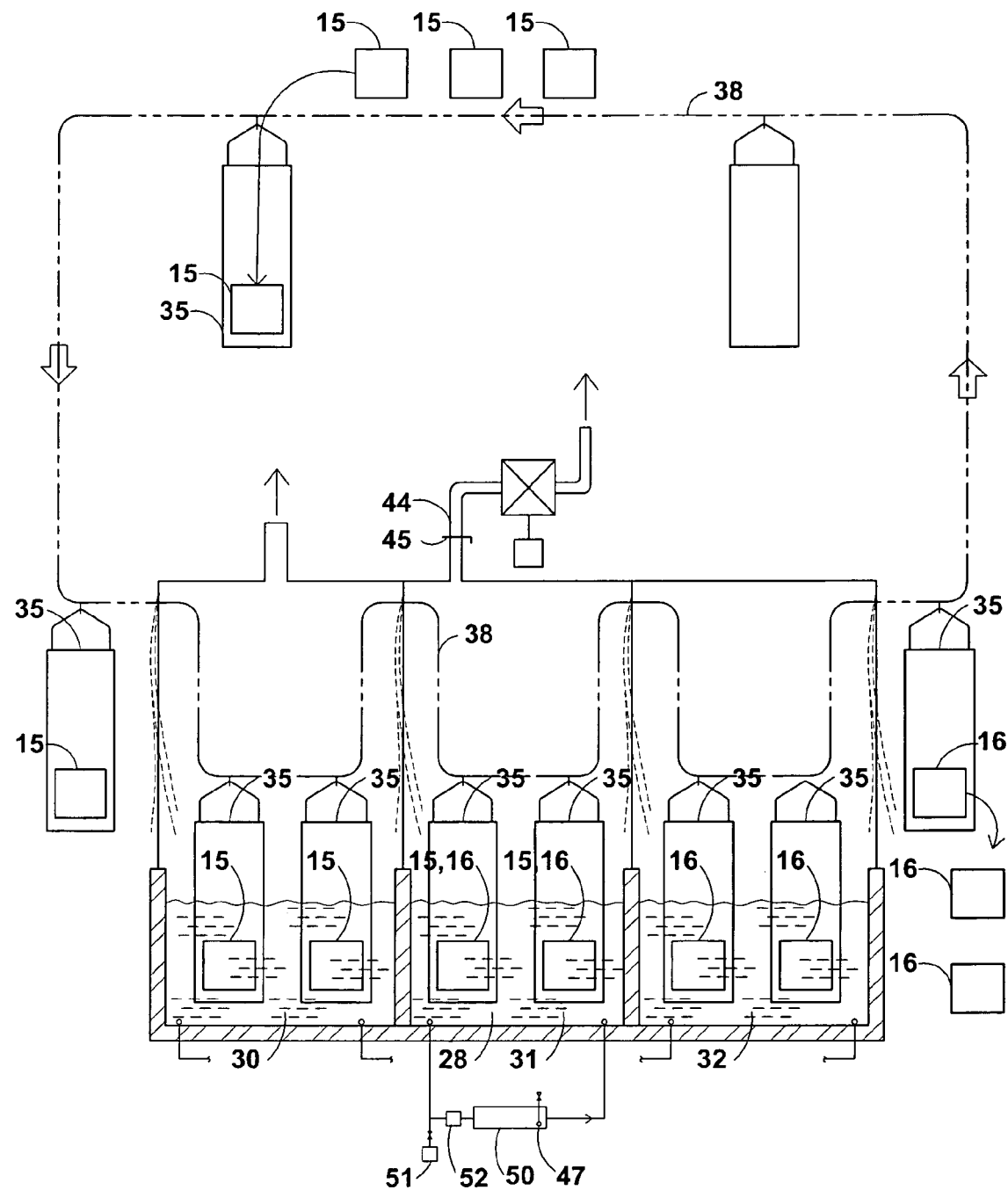
FIG. 13 shows a schematic elevation view of the conduction heating process.

FIG. 13 shows a schematic elevation view of the conduction heating process of the second preferred embodiment of the present invention. The racked metal chambers contain wood sheets in physical contact with the interior metal surface of chambers. Conduction heat transfer then occurs between the metal of the chamber and the wood. The wood gains the heat energy from the partially submerged metal surface that is heated by the heat transfer fluid in the vats. The conduction heated wood sheets are being converted to torrefied wood sheets (TWS). Three heat stages are shown, pre-heat, heat treatment and cooling.

Figure 14:
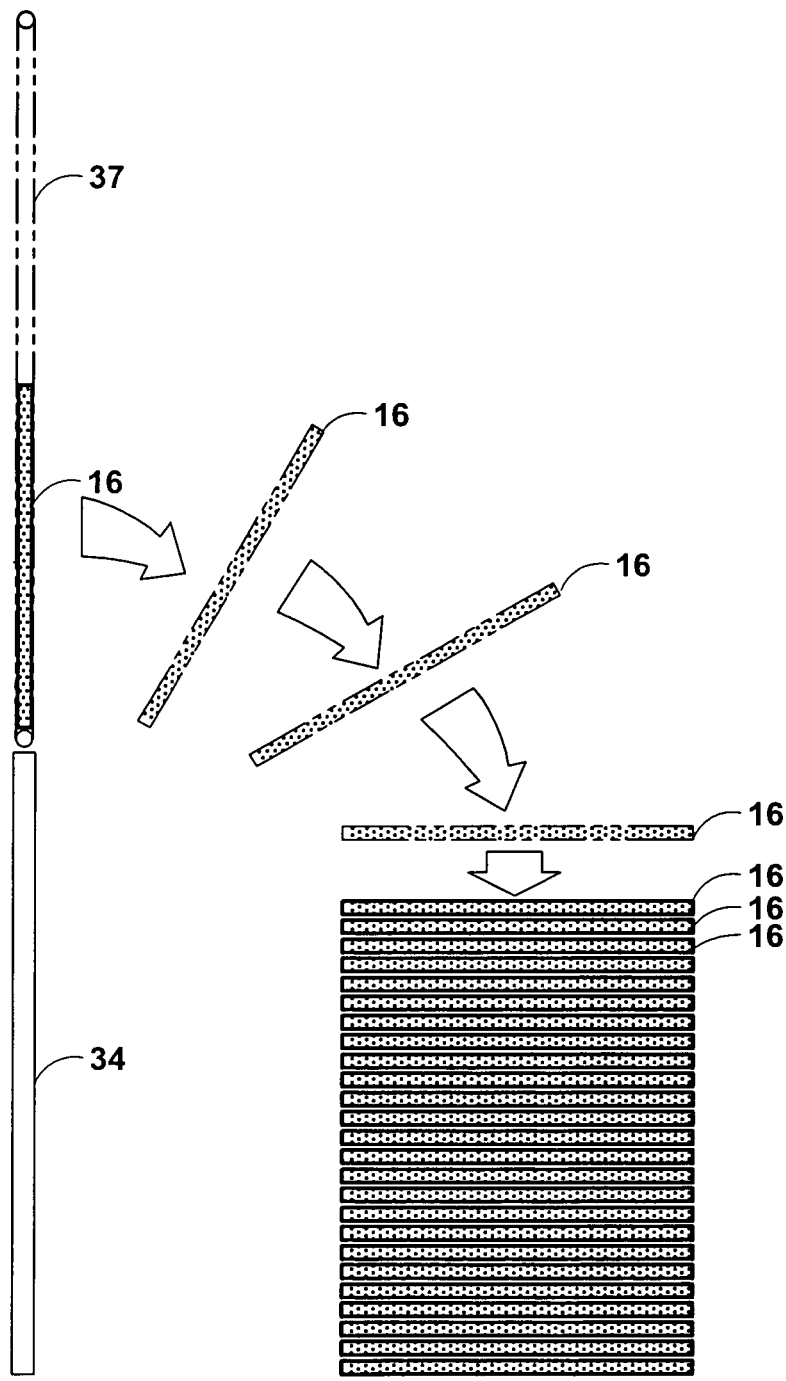
FIG. 14 is a schematic view of a metal chamber as a wood sheet (TWS) is being removed and stacked the air cooling and unloading section of the process.
Figure 15:
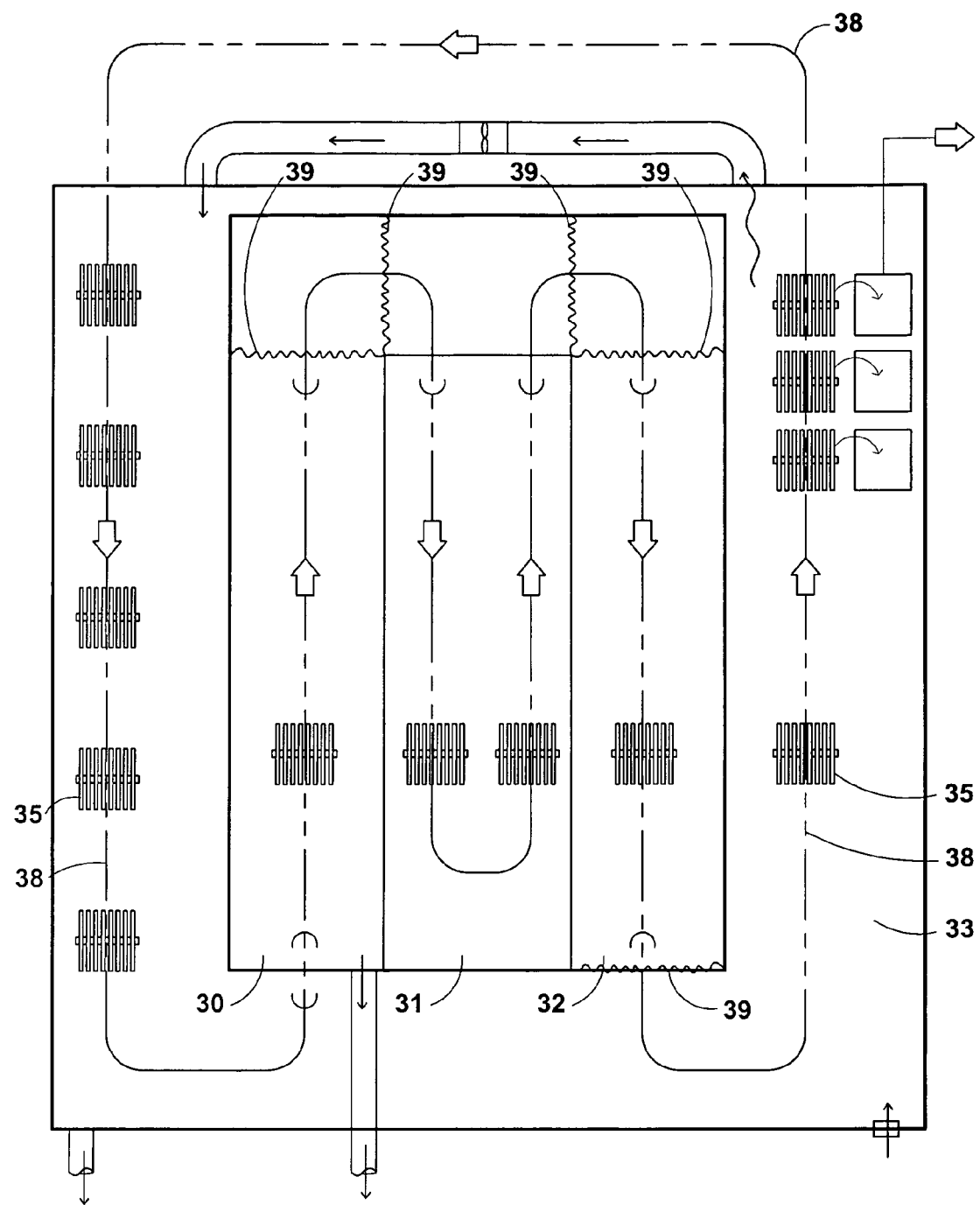
FIG. 15 is a schematic plan view of the heating and treatment process showing the overall conveying path of the wood sheets including Loading, Pre-Heating, Heat Treatment, Cooling, Air Cooling and Unloading Sections in an embodiment that utilizes Mittal Chambers 34 with a rack 35.
Figure 16:
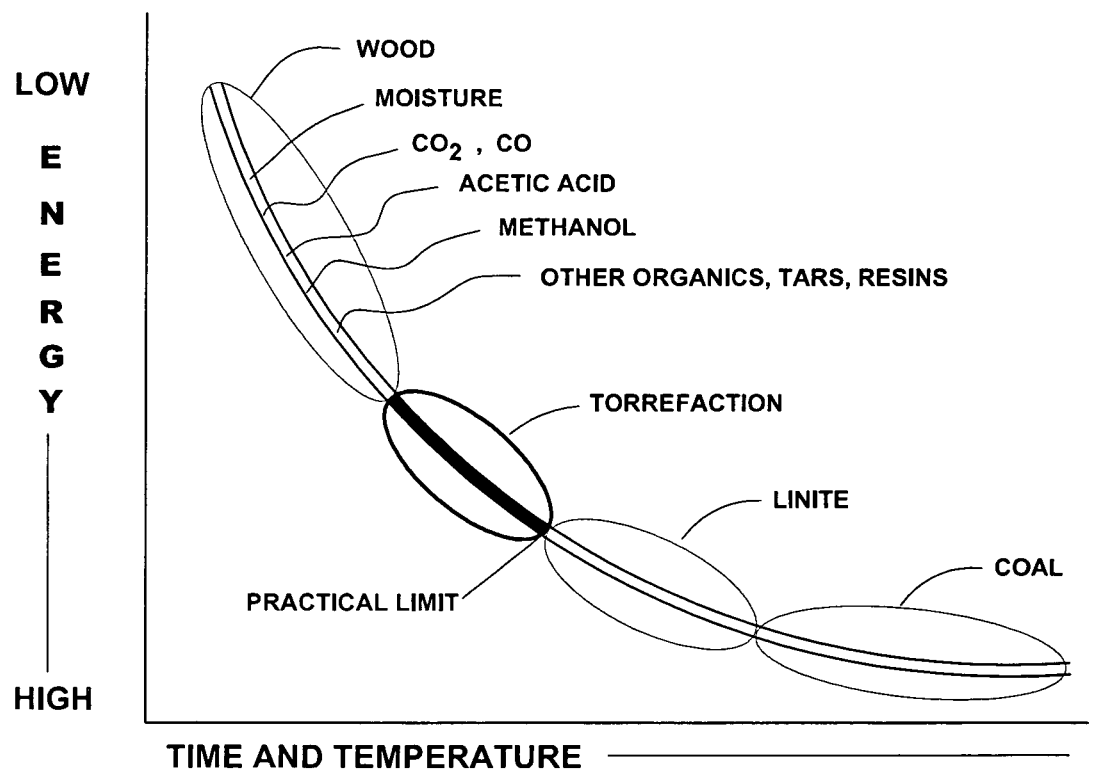
FIG. 16 is a diagrammatic chart of the phases of wood when exposed to "Time and Temperature" along with its relative Energy value.

FIG. 14 is a schematic view of the metal chamber 34 in a vertical position with the removable rod 37 in an upper position where the wood sheet (TWS) is being removed and stacked. This occurred in the air cooling and unloading section of the process. FIG. 15 is a schematic plan view of the heating and treatment process showing the overall conveying path of the wood sheets. This includes Loading, Pre-Heating, Heat Treatment, Cooling, Air Cooling and Unloading Sections. This embodiment utilizes one or more endless conveyor belts to transport the chamber racks FIG. 16 is a diagrammatic chart of the phases of wood when exposed to "Time and Temperature" along with its relative Energy value. The torrefaction phase occurs as soon as most of the moisture, gases, acids and other organic materials are driven out of the wood during the heat treatment phase. The closer the biomass is converted from wood to charcoal, the more energy is used to drive out the remaining moisture, gases and organics. The most practical energy efficient fuel point is torrefied wood with its high percentage of carbon content and lack of moisture, gasses and volatile organic compounds (VOC's).

Figure 17:
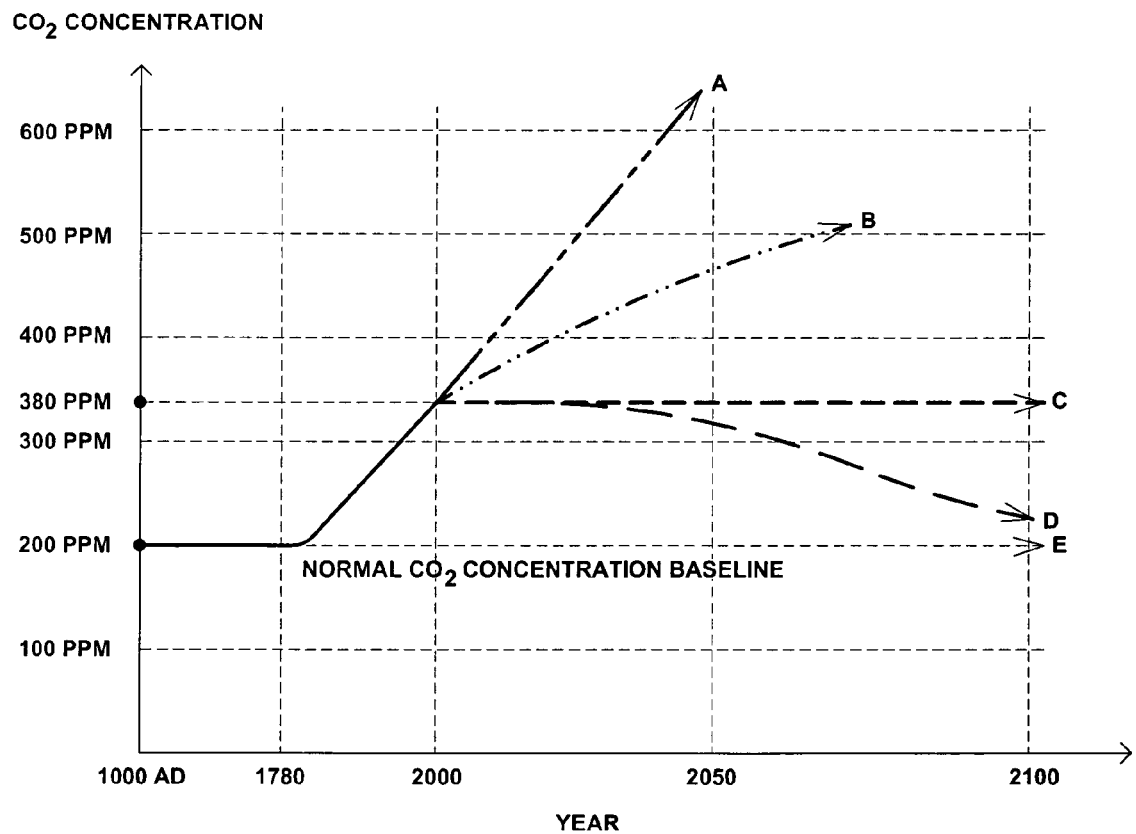
FIG. 17 is a chart of the carbon dioxide concentration in our atmosphere over the last thousand years with a future projection.

FIG. 17 is a chart of the carbon dioxide concentration in our atmosphere over the last thousand years with a future projection. The curves show the expected carbon dioxide $CO_2$ concentration results based on the following:

Curve A: This is the expected increase in $CO_2$ at the present rate of use of fossil fuels. During the last 200 to 300 years $CO_2$ has increased about 35% due to fossil fuel use. The rate is increasing rapidly as developing nations use more fossil fuels.

Curve B: This curve shows how the concentration could decrease if 50% of coal presently used was replaced with the torrefied wood product in accordance with the present invention in co-firing electric power generation plants.

Curve C: This curve shows how $CO_2$ concentrations would level off if 100% of the current coal use were offset by the torrefied wood product in accordance with the present invention on a pound per pound carbon basis.

Curve D: This curve shows how the $CO_2$ concentration would start to become lower and approach levels in the past if torrefied wood products in accordance with the present invention were used as offsets and used to replace coal in electric power generating plants. Torrefied wood pellets could also be used for home heating and stoves and many other uses that should be encouraged to bring our $CO_2$ level back to near normal levels before fossil fuel use.

Curve E: This shows the normal baseline $CO_2$ concentration since the year 1,000 AD as a reference line or goal to achieve in the future.

FIG. 15 illustrates the Loading, Pre-Heating, Heat Treatment, Cooling, Air Cooling and Unloading Sections of the second preferred embodiment of the present invention. In this embodiment an overhead conveyor 38 that move a plurality of chambers each containing a wood sheet 15 to each of the respective sections. The nature of these sections will be more specifically understood by the following:

a. In the Pre-heat section 20, 30, the heat energy is used to heat the wood material to a temperature above 300 F where the heat energy causes the water within the wood to rise in temperature to a point where it changes into steam and is driven out of the wood. Some other gases are also driven out in this section.

b. In the Heat Treatment section 21, 31, the heat energy causes the wood temperature to rise to 460 F where the heat energy drives out the VOC's. In addition, part of the heat energy results in a transformation of the wood into torrefied wood by altering the chemistry and structure of the wood in an endothermic reaction. A heater is used to continually add heat energy to the heat transfer fluid to maintain a temperature above 460 F and may be over 500 F.

c. In the Cooling section 32, heat energy is transferred from the torrefied wood within the chamber through the metal and into the heat transfer fluid. This causes a cooling of the TW to below 320 F.

Figure 18:
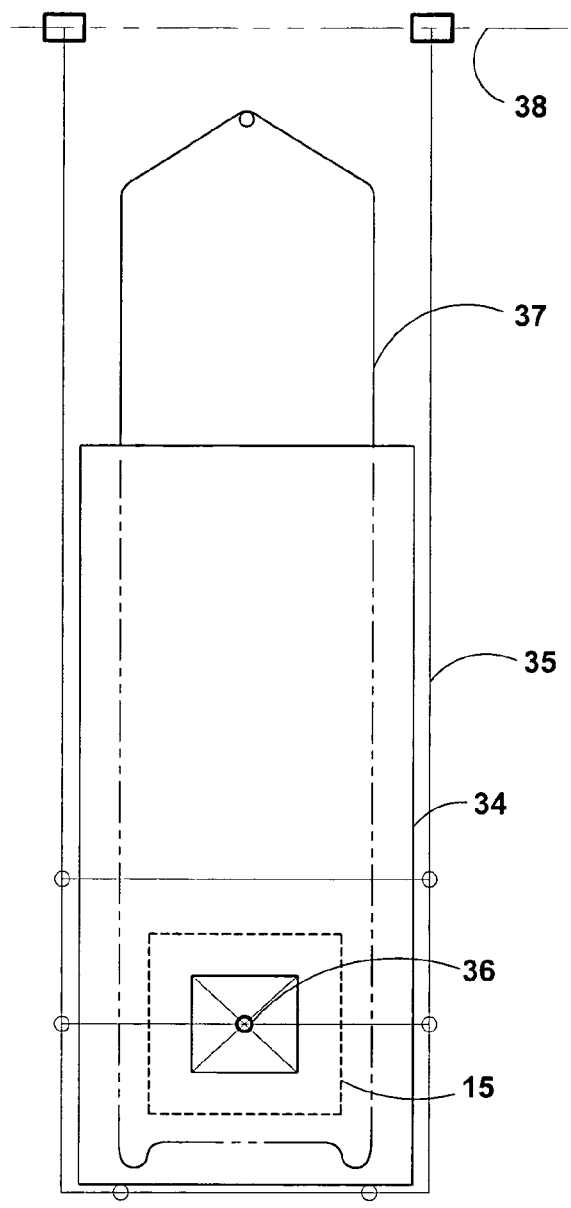
FIG. 18 is a side elevation view of the rack and the chamber.

FIG. 18 is a side elevation view of the rack 35 and the chamber 34 with clamp 26 that keeps the chambers 34 pressed against the wood sheets 15, 16, 17. The clamping 26 action maintains maximum surface contact between the hot metal and the wood surfaces for maximum "conduction" heating. It should be noted that the clamp 26 system includes a spring type action that continually presses against the chambers 34. This action maintains metal to wood contact during the heating process as the wood sheets 16 shrinks as it is torrefied into TWS 17.

FIG. 19 is a partial elevation view of the rack 35 and chambers 34 that show spacers 29 located between the outside of each chamber 34. The spacers maintain a fixed distance between chambers 34 so the HTF 28 can circulate all around the outside surface of the chambers 34. The clamping 26 action may include a spring metal support or tong like support that maintains constant pressure on the clamps.

The spacers may be approximately ¼ or ½" thick to maintain the desired clearance for the HTF to circulate. The spacers 29 may be part of the rack 35 system and may also act as a guide as the chambers 34 are loaded into the rack 35. The spacers may also be ½" diameter rods that extend across the rack keeping the chambers in even alignment.

The heat transfer fluid may circulate between the Pre-Heat section and the Cooling section to efficiently heat and cool the wood without using much outside energy. Heat exchangers may be used to add or eliminate some of the heat energy if required.

All the heating and cooling of the wood and TWS occurs without any physical contact of the heat transfer fluid with the wood. Only direct conduction heating occurs between the surface of the metal of the chamber and the wood surfaces within the chamber. A thin chamber of thin sheet of wood is preferred for fast heating.

When the ¼" thick wood sheet is sandwiched between two metal conveyor belts or between the two sides of a metal chamber then the conducted heat at the wood surface need only travel ⅛" to the center of the sheet.

The surface of the conveyor belts in contact with the wood sheet may have slight grooves to allow for expelled gasses to escape from the wood.

The apparatus for biomass torrefaction which includes existing technology to turn biomass 11 into a pulp 13 and press it into a sheet form by press, rollers or other means. Once the wood sheet 15 is formed it enters the processing part of the invention. The wood sheet 15 is conveyed along by means of heated conveyor belts that transfer heat energy from the metal surface of the heated belt 20 directly to the thin wood sheet 15 on each side. In essence, the entire wood sheet 15, except the ¼" edges is in surface contact with the heated metal belts 20. The belting may have a slightly irregular surface or a series of small grooves that allow the steam 41 and VOC's 42 to escape as the wood is heated. The escaping gases 40 exit the edges of the belts where they enter an exhaust system 43.

Pre-Heat Section: The continuous sheet of wood is conveyed by belts 21 heated to a temperature above 340 F where the wood sheet 15 is heated to 320 F. This will primarily drive out water, in the form of steam 41, within the wood. It is very desirable to remove only the water from the wood first so it can be safely exhausted separately as steam to the ambient air.

Heat Treatment section: The continuous sheet of wood will then be conveyed by heated belts 21 at above 480 F where the contained VOC's 42 will be driven out and it is desirable to capture these very polluting gases separately so they can be treated, captured, condensed, burned in a stack flare or used as fuel in the heater 50. During this heat treatment section the wood continues to be heated and undergoes a endothermic reaction where the chemistry and structure of the woof fibers and cells change into a friable material. This transformation is called a Torrefaction process. The torrefied wood sheets 16 are now at 480 F and if exposed to oxygen in air would be combustible. The expelled water in the form of steam 41 and other gasses 42 from the heated wood displace the air and oxygen to the slot exhaust system 43. As the moisture and gasses escape from the heated wood sheet they enter the space between the edges of the belts. The narrow slot thereof fits snugly between the belts and captures all the escaping gasses. This prevents air with oxygen from entering that space. This prevents combustion that may occur at the temperature required for the process.

This provides the oxygen free environment needed to prevent wood sheet 15 or torrefied wood sheet 16 combustion at high temperatures.

Cooling Section The continuous sheet of torrefied wood sheet 16 will then be conveyed by cooling belts 22 in order to quickly cool the hot torrefied wood sheet 16 to below 320 F.

Air Cooled Section: The continuous sheet of torrefied wood sheet TWS 16 will then be cooled further by using air flowing over the TWS 16 surfaces. The TWS would then be cut in sheets or small torrefied wood pellets TWP 17.

Sheet Cutting Operation: The continuous moving TWS 16 would then be cut into sheets that may be 4'×8'. These sheets could be stacked for a convenient form of transport for long range storage and used for Carbon "Off-Sets" 58. Every ton of carbon in the TWS stored would be considered a "Carbon Offset" 58 and could be traded as a commercial commodity.

Pellet Cutting Operation: The continuous moving TWS 16 could be cut into narrow strips or pellets that are ¼"×¼" by 1" long. These TWP 17 could be loaded onto train cars 54 for delivery to a coal fired electric power plant 56 where the pellets could be "co-fired" with the coal. If the rate of 15% TWP 17, based on carbon content, were used the net reduction in carbon dioxide would be 15%.

Variations: The "conduction" method of heating wood for Torrefaction can take a number of forms in addition to the pressed and roll sheet as described above. Due to the different types of biomass, location, degree of Torrefaction necessary for a particular use, and for any number of other reasons these include, but are not limited to, the following:

Pellet Mill Torrefaction: In this embodiment the rollers and presses that normally produce the wood pellets would include an extended series of tube (pellet) holding tubes that would hold large volumes of wood pellets. These tubes would then be exposed to conduction heating where Torrefaction would occur and form TWP 17.

Indirect Conduit Torrefaction: In this embodiment a conventional pellet mill 18 would produce wood pellets 14 using existing technology. The wood pellets 14 would be loaded into a elongated conduit, that looks like a flat oval duct say 2" by 24" or may be deformed have extended internal surface. The conduit would include a conveying means to move the wood pellets 14 through the elongated conduit. The exterior of the conduit would be heated and the wood with be in contact with the hot interior surface of the metal conduit. The wood pellets 14 would not come in contact with the heating fluid. The elongated conduit may include a pre-heat section, a heat treatment section and a cooling section.

Indirect Hot Immersion Bath Torrefaction: In this embodiment the wood sheets would be placed in a series of narrow metal chambers 34 that in a preferred embodiment are 3' wide×5' high and only ¼" deep with an open top. The metal chambers 34 would be stacked together on a chamber rack in and partially submerged into a hot bath of heat transfer fluid 28. The wood sheets 15 may only half fill the metal chambers 34 and the top of the metal chambers 34 in the preferred embodiment are at least a foot above the surface of the immersion bath fluid or HTF 28. This would allow the steam 41 and VOC's 42 that are driven out of the wood to be exhausted without having any heat transfer fluid 28 coming in contact with the wood pellets 15, 16.

The invention also includes an article of manufacture that includes a combustible article of manufacture which includes torrefied biomass therein, namely TWP 17.

The present invention utilizes the "renewable" biomass 11 derived from solar energy 59. The teachings of this invention turn this "renewable" biomass 11 into a new compact, clean burning fuel with a high carbon content that can supplement of replace coal in electric power generating plants 56. This fuel is referred to herein as torrefied wood products 17 in accordance with the present invention. The term TWS 16 or TWP 17, as used herein will be understood to refer not only to sheet or cube shaped module of biomass that has been torrefied in accordance with the present invention as well as other shapes including modules, comminuted material, pellets, cubes, having ether individual pieces that are either uniform or non-uniform. In some embodiments various procedures for densification of the torrefied biomass will be employed.

This invention includes a method and apparatus to produce a renewable solar energy 59 fuel. Not only can this new fuel be used in co-firing with coal in electric power plants 56 it can also be used as an Energy and Pollution "Off-Set", sometimes referred to as a "Carbon Off-Set" 58 for long term storage. For every ton of carbon in torrefied wood pellets TWP 17 used, one ton of coal need not be burned, and saves 3.67 tons of net carbon dioxide from entering our air.

The apparatus and method of the present invention will ordinarily utilize energy crops (produced solely for the purpose of providing energy), however, the apparatus and methods of the present invention may also use biomass 11 that would otherwise be left to decay and/or decompose. Ants, termites and microbes generate methane gas from biomass and that is considered one of the main Green House gases.

The apparatus and method of the present invention have many advantages over other carbon reduction methods as mentioned above and with many of the other promising future technologies. For example, the teachings of this invention can immediately result in a reduction in the use of coal just by using torrefied wood pellets (TWP) 17 in co-firing with coal in existing electric power plants. Eventually torrefied wood pellets (TWP) 17 can replace coal use for electric power generating plants 56. Torrefied wood pellets (TWP) 17 are friable and compatible with existing coal handling and firing equipment in co-firing. This makes this renewable fuel very attractive for all existing coal burning facilities 56. TWP 17 provides a very uniform, high energy content fuel source that can greatly improve the operation and efficiency of gasification systems for power generation.

Farmers are actively engaged in developing "Energy" crops to produce bio-fuels such as ethanol and bio-diesel. One particular encouraging biomass energy crop is called Switchgrass 11. The central plains of the United States had tens of thousands of acres of switchgrass when the buffalo roamed the United States prairies. Current technologies have already made this an important fuel source with many of the technical problems already solved. Existing technologies exist to harvest, dry and mill the wood biomass material including switchgrass into a densified pellet form for use as a fuel. A great many pellet mills 18 produce millions of tons of wood pellets 14 per year for home heating and stoves. Pellet mills 18 can drastically reduce operating costs and increase efficiently with greater production volumes. Many mills 18 are waiting for an outlet that can utilize this wood based fuel. The major problem with these wood pellets 14 produced is that they tend to absorb moisture from the air and break down quickly. They have to be used quickly and do not store well. They also contain moisture and volatile organic compounds that produce too much smoke and contaminants when burned for most energy applications.

The need for a solution to developing a new processing method that is simple, safe, efficient and practical for major commercial use, has been a driving force leading to the development of this substantial improvement over the prior art. The apparatus and method of the present invention overcomes all the previous problems that prevented torrefied wood 16 from becoming a practical coal replacement fuel.

Finally, a new clean burning, high carbon content, dense friable fuel for immediate use in co-firing with coal and for use as energy and pollution carbon offset 58 can be produced at a fraction of the cost of all prior art methods. This invention can result in the eventual total replacement of coal and save billions of tons of carbon from fossil fuels from entering our air. This in turn can make a significant impact on our quest to reduce the increase in the concentration of carbon dioxide 57 entering the atmosphere.

The increase of coal use in China alone is staggering. They are commissioning about one large coal fired plant 56 per week to keep up with their growing energy needs. The pollution generated in China from these coal fired plants 56 is creating tremendous health problems for all in the path of the contaminants emitted. Millions of people are at risk from breathing the unhealthy air not only in China but here in the United States. Recent air sampling tests in California showed about 25% of the contaminants drifting along the coast originated in China. It is very important for developing nations to take advantage of this clean renewable fuel technology and turn away from coal use for the health and well being of all.

In a preferred embodiment of the invention, a continuous moving sheet 15, 16 of wood is subjected to heat treatment by sequentially moving the wood sheet 15, 16 through moving heated conveyor belts 20, 21, where heat is transferred by direct "Conduction" by the metal belt 20, 21 to wood surfaces. Conversely, the moving sheet 15, 16 is cooled as it passes over the perforated belt 22 in the cooling section in which ambient air is blown through the metal belt 22. This conduction heat treatment process utilizing conveyor belts 20, 21, 22 and conveying the sheet of wood 15, 16 through a pre-heat section, then a heat treatment section and then a cooling section can result in torrefication of the sheet of wood 16.

The expelled steam 41 and VOC's 42 are captured and removed at each section of the process. An exhaust conduit inlet 43 is dimensioned and configured with a slot shaped exterior contour so as to be snugly placed between the edges of the conveyor belts 20, 21 as shown in FIG. 8. The pre-heat section exhausts the steam 41 from the wood to the ambient. The cooling section exhausts the warm air to ambient or may recycle the air for use in the pre-heat section.

The exhaust steam and VOC gasses 42 may be directed through the exhaust vent pipe 44 to a condenser. This may be air or water cooled using standard existing technology. The steam may be condensed into water and some of the VOC gasses 42 may be captured and condensed into a liquid for other use. The VOC gasses 42 may also be routed to the burner section of the heater 50 and used as a fuel. It has also been common to route the exhaust gasses 42 to a Gas Flare Stack where the gasses are burned.

When wood is heated, at high temperature in the absence of oxygen, for a certain period of time, it gradually turns into torrefied wood. Torrefied wood lacks the moisture and volatile organic compounds (VOC's) and is chemically and structurally different than the wood entering the system. It burns considerably cleaner than wood as almost all the moisture, gasses and undesirable volatile organic compounds have been removed. Torrefied wood has a high percentage of carbon and may be used directly as a fuel or be co-fired with coal in electric power generating plants 56.

The term "wood" as used herein is intended to comprehend trees, grasses, agricultural waste, sawdust, lumber waste and most other forms of plant material. More particularly, in the preferred form of this invention the biomass 11 described may be an energy crop such as switchgrass. Pellet mills 18 have been increasingly used to convert biomass 11 into a convenient compacted form for transport and use. The average bulk density of collected biomass 11 is 10 to 15 pounds per cubic foot. By using a pellet mill 18 the compacted wood density is increased to 40 pounds per bulk packed cubic foot or more. The density of the pellet 14 may be over 60 pounds per cubic foot. Wood pellets (WP) 14 are the final product of pellet mills 18 and are used for wood stoves, heating, and boilers. The problem with using wood pellets 18 is they still contain significant quantities of moisture, gasses and volatile organic compounds (VOCs) that are released during combustion. In addition, wood pellets (WP) 14 are hydroscopic, non-uniform and very susceptible to degrading due to moisture absorption and cannot be stored for long periods.

This invention includes:

1. A new processing method—by direct metal to wood surface "conduction" heating resulting in a Torrefaction process. This process makes use of heated metal surfaces in direct contact with a thin sheet of compressed wood.
2. A unique equipment configuration—A thin sheet of wood formed by rollers or a press is conveyed by metal belting on each side and the heat energy is transferred to the wood sheet by direct conduction. This allows for continuous product flow through multiple sections at different temperatures at atmospheric pressure.
3. A practical renewable fuel from biomass—torrefied wood (TW) in the form of sheets or pellets (TWP) 17. The terms torrefied wood pellets (TWP) 17; or torrefied wood products 17 in accordance with the present invention are used herein for all forms of torrefied wood including but not limited to sheets, pellets, or lumber. The term TWP 17 will be understood to be any compressed torrefied wood, including plant matter, in sheet, cube or other form factor.
4. Partial torrefaction can also be provided where it is desired to produce a less heat treated form of torrefied wood, at least with certain biomass materials. In such cases the process primarily removes the moisture and volatile organic compounds (VOC's) by using lower temperatures or faster operating speeds with shorter heat treatment time periods.
5. A new practical energy and pollution "offset" product in the form of torrefied wood sheets 16, 17 or products in accordance with the present invention to offset carbon use by fossil fuels.
6. A practical method to reduce the added concentration of carbon dioxide 57 in the atmosphere caused by fossil fuels by creating and using torrefied wood 17. This torrefied wood 17 can co-fire with coal as a fuel for power plants 56. In addition, torrefied wood (TW) 17 resists decomposition for hundreds of years and can be used as an Energy "offset" 58 when factories want to expand operations. This "offset" 58 feature also allows more time for development of other clean burning renewable energy fuels and other promising technologies.
7. This invention utilizes a "Bootstrap" energy transfer concept that results in an extremely practical and efficient process. Most of the energy gained in the torrefied wood sheet (TWS) 16 cooling section may be transferred and used in the wood sheet 15 pre-heat section. In addition heat recovery or pre-heating can be utilized from my previous U.S. Pat. No. 4,539,916 Apparatus for cleaning Flue Gases and other Gases.

The cooled torrefied wood pellets (TWP) 17 are conveyed to a central packaging system where the (TWP) are packaged for distribution and or distributed in bulk. Examples of bulk distribution include:

1. torrefied wood pellets (TWP) 17 are delivered in bulk form in train cars 54 to electric power plants 56 to be co-fired with coal.
2. torrefied wood pellets (TWP) 17 are delivered to the heater 50 system of this invention to provide virtually all the heat energy necessary to process the wood sheets into torrefied wood sheets (TWS) 16 and then to TWP 17.
3. torrefied wood sheets TWS 16 or TWP 17 or torrefied wood products in accordance with the present invention are packaged and delivered to major storage facilities where they are stored for long periods as Energy and Pollution carbon "offset" 58.
4. torrefied wood pellets TWP 17 may be used as a uniform fuel source for gasification projects in lieu of natural gas.

Preferred embodiments of the present invention include at least some of the following specific features. The invention relates to methods and apparatus for biomass torrefaction, manufacturing a storable fuel from biomass and producing offsets for the combustion products of fossil fuels and a combustible article of manufacture.

Direct contact "Conduction" heating between the heated metal belt surface and the thin sheet of wood surface provides fast and efficient heat treatment of wood into torrefied wood at ambient pressure. The continuous moving sheet of wood in contact with an upper and lower heated conveyor belt efficiently accomplishes the heat treatment of Torrefaction.

The apparatus and method includes a control for time in the heat treatment section and precise temperature control due to use of conduction heat transfer conveyor belts instead of steam or inert gas as typically used in the prior art. The present apparatus and method permit the use of an extremely simple system, equipment, controls and operation that is also extremely efficient at up to 90% effectiveness of energy production. The system in accordance with the present invention is practical for a wide size range including small, medium, large, and super large torrefaction wood sheet or pellet systems. The system is also ideal for multiple independent systems with a common header. This allows for standby and for processing different wood products at the same time. The system utilizes a unique double conveyor belt that sandwiches the sheet of wood between the heated belting. More particularly, this continuous operation may be attained with only a modest manpower requirement. The present invention cuts manufacturing time for producing torrefied wood by up to 60% over prior art methods.

The wood 11 utilized in the system may be trees, prunings, grasses including switchgrass, waste wood, composition wood, lumber, agricultural waste and wood biomass of almost any type. (Thus, the term "wood" as used herein includes all biomass 11 including but not limited to both traditional woody materials as well as herbaceous plant matter.) It is preferred that the overall carbon element content of the wood be 50% or more in most applications. The wood cells contain cellulose, sugars, water, gasses, volatile organic compounds (VOC's) and other digestible materials found in biomass. The untreated wood cells are hydrophilic (absorb water) and could be consumed by insects or microbes if left to natural decomposition. Since collected biomass 11 may only weigh 10# to 15# per cubic foot bulk weight, it is now becoming an industry wide standard to compact or densify it to make transport and handling more practical. Collected biomass 11 is commonly collected and delivered to a pellet mill 18 where it is densified 3 or 4 times and pressed into mainly pellets, sheets or other solid forms. The final wood sheets or pellets (WP) 14 density may be 40 pounds per bulk cubic foot.

The wood pellets (WP) 14 may be formed from most forms of biomass 11 (It will be understood that term "wood" is used herein to include all biomass and the term "pellet" includes sheets and other shapes.). The pellets may be manufactured from a biomass 11 such as switchgrass or other wood sources that has been processed through a pellet mill 18 and densified and pressed into sheets. The weight may be 40 pounds per bulk cubic foot. The moisture content may be 5 to 10%. The volatile organic compounds (VOC's) and other gasses may be 10% or more. The carbon content varies with biomass type and environmental conditions. The fuel energy content may be 8,000 Btu/pound but undesirable smoke and volatile organic compounds (VOC's) form during combustion making wood burning an environmental concern that greatly limits its use as a fuel. Being hydrophilic in nature it is very subject to humidity and breaks down quickly as it absorbs water. This speeds up decomposition and requires it to be used quickly after it leaves the pellet mill 18.

The system for turning wood pellets (WP) 14 into torrefied wood pellets (TWP) 17 in the present system includes subjecting the pellets or sheets to direct conduction high temperature heat transfer surfaces of 480° F. for approximately 15 minutes or more. The high temperature energy drives out the unwanted water, gasses, and many volatile organic compounds (VOCs). The high energy intake, endothermic reaction, causes a molecular transformation of the cellulose, sugars and cell content into a hydrophobic friable high carbon based product without the unwanted water, gasses and volatile organic compounds (VOCs). The wood cells have now becoming "torrefied" and the new fuel formed from wood pellets that are called torrefied wood pellets (TWP) 17 herein.

1. Torrefied wood sheets TWS 16 or pellets or products (TWP 17). This is a partially carbonized form of wood that has very desirable fuel properties. The wood cells are now hydrophobic and repel absorption of water and have no digestible properties, therefore, no danger of decay or natural decomposition by insects or microbes. Like carbonized wood, the life expectancy may be hundreds of years or more. When wood is torrefied it is essentially no longer wood as we know it. It is more like a friable hard plastic like material. The density is increased to about 50 pounds per bulk cubic foot. The pellet material may now have a density of 60 to 70 pounds per cubic foot. Torrefied wood pellets (TWP) 17 is used in this invention description for clarity. However, torrefied wood (TW) or torrefied wood pellets (TWP) 17 may be in other forms and shapes or torrefied wood products in accordance with the present invention for use as "offsets.

The wood biomass exposed to the heat transfer by conduction heating undergoes a partial low level form of pyrolysis (gasification) where gasses are driven out of the wood. The wood undergoes chemical and structural changes. The result is wood that has a higher percentage of carbon, higher heat content and much less volatile organic compounds than untreated wood. Once the wood approaches the conduction heat transfer temperature additional heat energy is still required in an endothermic reaction to complete the transformation process from wood to torrefied wood. During this time in the process very complex and mostly unknown chemical conversion changes occur in the wood material as it become torrefied. Continued heating, beyond the ideal torrefied stage, would result in unwanted gasification where carbon and energy would be lost.

The torrefied wood pellets (TWP) 17 have a heating value that approaches 9,000* Btu per pound as compared to 10,000 to 15,000 Btu per pound for bituminous coal which is the primary fuel for electric power plants 56. However, even with only ⅔ the energy content of coal the torrefied wood pellets (TWP) 17 produce "Zero" net air pollution because it is considered a "Renewable Energy Fuel", whereas "Non-Renewable" coal produces "100%" air pollution mainly in the form of carbon dioxide 57 and other greenhouse gases. The very good news from limited tests where torrefied wood pellets (TWP) 17 has been used in co-firing with coal, as a combined fuel for power plants 56, has resulted in much cleaner burning and less harmful air pollution. This combination fuel has had very limited use due to the very high cost, non-uniformity, and scarcity of torrefied wood pellets (TWP) 17. It is the intent of this invention to change this so that torrefied wood pellets (TWP) 17 are inexpensive, uniform, and plentiful and used in a much higher percentage with coal to drive down the added carbon dioxide 57 entering our air from fossil fuel.

The process in accordance with the present invention that converts wood into torrefied wood pellets (TWP) 17 uses heat energy to preheat the wood to drive out moisture 41. Then the wood is heated to the desired torrefaction temperature. Heat energy drives out additional moisture and volatile organic compounds 42. In addition, heat energy is consumed by the wood in an endothermic reaction that occurs within the wood cells that alters the molecular structure and chemistry of the wood cells. This endothermic phase transition uses heat energy without raising the temperature of the torrefied wood. In addition, the heat loss from the equipment and exposed equipment system surfaces and other losses need to be added to determine the overall efficiency of the process. As compared to all other prior art methods of torrefaction, using steam, air, inert gas, vacuum and superheated steam, this conduction heating invention method uses considerably less energy. Direct conduction heating between metal to wood surfaces puts considerably more molecules in direct contact with the wood being torrefied than other methods. Finally, this invention provides a method of making torrefied wood pellets (TWP) 17 in a manner that is practical, utilizing materials that are plentiful and at very low cost so the method and apparatus may be used extensively everywhere. The processing part of this invention can be easily added to existing technology system that produce products such as composition wood sheets The heating means that imparts heat energy to the conveyor belts may be from almost any heating source but the preferred method would be the use of heat transfer fluid that would heat the plate heaters that in turn heat the belts.

Coal is the primary fuel used for electric power generation plants 56 and is the main source of man made air pollution in the world. Oil use is the second main source. Natural gas is relatively clean as compared to oil and coal but it also creates carbon dioxide 57 which is a greenhouse gas. Coal has many impurities and heavy metals and many other gases are formed during burning. This application mainly refers to carbon dioxide; however, those skilled in the art will recognize that many other greenhouse gases and other contaminants are produced with coal use.

The present disclosure utilizes several terms of the art. The term "Co-firing" as used herein refers to utility companies mixing a small percentage of wood biomass with coal in the coal firing equipment of a large coal-burning, utility boiler. The term "Greenhouse gasses" refers to emissions produced by the combustion of non renewable fossil fuels such as coal. The advantage of co-firing includes displacing the fossil fuel coal and lowering utility carbon dioxide 57 emissions from fossil fuels. Carbon dioxide emissions from wood and agricultural waste is generally considered "carbon neutral", that is, it gives up what was taken in during the growth cycle.

As countries try to reduce $CO_2$ 57 emissions, utilities will receive benefits by reducing emission of greenhouse gases resulting from reducing the combustion of fossil fuels and substituting emissions from wood fuel. These $CO_2$ "offsets" are the basis for the benefits granted by a government. Known waste wood and wood pellets fuels contain too high a percentage of moisture and volatile organic compounds for use as an environmentally friendly fuel. This invention converts the wood pellets into dry, torrefied wood pellets that have most of the volatile organic compounds removed. The torrefied wood pellets 17 burn cleanly, approach coal in carbon content and mix easily with coal in existing firing equipment 57.

Unlike previous wood and wood pellets that were only used in 3 to 8% mix with coal, TWP 17 can be used at 15% or higher. It is expected that TWP 17 can replace coal completely with few modifications to equipment. A goal of this invention is to use torrefied wood pellets 17 and other biomass energy such as bio-diesel in the transporting and processing of the wood and or grasses into torrefied wood pellets 17 in order to reduce the use of any fossil fuels. Bio-diesel may be used as the fuel in the transport vehicles to avoid the use of fossil derived diesel fuel. In addition, bio-diesel electric power generators are increasing in use with hydrocarbon and sulfur emissions essentially eliminated and CO emissions reduced by 50%. It is anticipated that TWP 17 will lead to an increase in use as a solid fuel source in gasification projects in lieu of natural gas.

Wood contains water, cellulose, hemicellulose, lignin and a small proportion of soluble extractives, (lipids and terpenes) and other carbon related compounds. During the overall processing operations virtually all of the water and most of the volatile gases are removed. Most of the moisture is driven out of the wood in the pre-heat section and may be vented or condensed with conventional technology. The volatile organic compounds that are driven out of the wood during the process may be condensed and separated into usable by-products. The volatile organic compounds may also be used as fuel for the heater or burned in stack flares. The volatile organic compounds burn much cleaner without moisture present.

When wood, containing moisture, is burned the formation of a great number of undesirable gases are formed due to the moisture content. This includes smoke with carbon monoxide, methane, nitrogen oxides (NOx) and other smog polluting gases. The cooling smoke and gases form soot, creosote and other toxic substances. This invention removes virtually all moisture within the wood and this allows for much cleaner burning. The torrefied wood pellets formed during this process are moisture free and have reduced volatile organic compounds and have a very high concentration of carbon.

The biomass 11 that would have been left to decompose into methane and other gases as it gives up the collected suns energy 59 can be processed into useful torrefied wood pellets 17. The torrefied wood pellets 17 then provides for practical energy use with clean burning emissions and practical carbon offsets 58 for fossil fuel use. This is a win-win-win condition. Numerous other social, economic, environment health and global benefits results from this invention. In essence this invention can help solve the greatest environmental pollution problem since man started using coal and fossil fuels to generate electricity.

Coal mining, extraction, processing and delivery has a side effect that is also environmentally disadvantageous. This process also takes energy and resources and generates pollution before it reaches the electric power generating plant 56. High quality coal with low sulfur content is becoming scarcer and the future for coal points to lower quality.

With conduction metal to wood heating, as in this system, lower temperatures of 480° F. will result in higher quality, more uniform torrefaction and still process torrefied wood pellets (TWP) 17 faster than prior art methods.

Advantageously, the pellet mill 18 will be close to a TWP processing plant 10 so that it will be practical to use the flue gases from the heater 50 to preheat the wood 11 prior to it being milled 18 into wood pellets 14. This could be done in accordance to the teachings of John A. Paoluccio's prior U.S. Pat. No. 4,539,916. Other existing heat transfer technologies such as a stack heat recovery coil may also be used to heat air indirectly for pre-drying the wood.

Reference numerals used in this application:

10 Invention. Direct Conduction Heat Transfer of metal to wood surface Torrefaction Process. This may include non-metallic belting.
11 Biomass. This includes all forms of biomass such as trees, grasses, waste wood and sawdust and agricultural waste. The preferred form of biomass source for this invention is switchgrass. The feedstock may be any carbon based biomass that contains cellulose, sugars, water, gasses, volatile organic compounds (VOC's) typically found in wood and grasses.
12 Collected biomass transported to mills for processing into sheets or pellets.
13 Pulp Wood: This is biomass that has been processed by blending wood into a pulp prior to entering a press or extrusion system. The pulp wood is directed to a press or rollers where it is formed into a long continuous sheet of thin wood such as composition wood is made.
14 WP—Wood Pellets
15 WS—Wood sheet. May be a dense wood sheet 4' wide x ¼" thick.
16 TWS—Torrefied Wood Sheet. May be 4' wide and continuous length. (or) cut Torrefied Wood Sheet. May be 2' x 2' x ¼" thick.
17 TWP—Torrefied Wood Product or Pellets. May be 4' x 8' x ¼" sheets or ¼" x ¼" x 1" long or any other size.
18 Mill: Roller or Press type mill where biomass is turned to pulp for conversion into a compressed sheet of wood that may be continuous and ¼" thick x 4' wide. This includes all mills including Pellet Mills that make wood pellets.
19 Roller presses that form the pulp wood into a continuous sheet of thin wood. This may be a 4' wide sheet of compacted wood that is ¼" thick
20 PRE-HEAT: Heated Conveyor Belt in Pre-Heat Section. The wood sheet is heated by heated conveyor belts to 320 F. by conduction.
21 TREATMENT: Heated Conveyor Belt in Heat Treatment Section. The sheet of wood is heated and maintained at a temperature of 480 F. by heated belts until the sheet of wood is torrefied. This is a oxygen free area.
22 COOLING: Heated Conveyor Belt in Cooling Section. The hot sheet of torrefied wood is cooled to less than 320 F. to avoid combustion. The cooling conveying belts will be at a lesser temperature to extract heat from the sheet of wood by direct conduction. The area above 320 F. is an oxygen free area.
23 Sheet Cutting Section: A cutter blade cuts the long continuous moving sheet of torrefied wood into 4' x 8' long sheets. These sheets may be stored for long periods and used as "Carbon Offsets". The sheets may also be cut in 2' x 2' x ¼" or other sizes.
24 Pellet Cutting Section: A cutting blade cuts the long continuous moving sheet of torrefied wood into ¼" x ¼" x 1" pellets. These pellets may be shipped by train cars to coal fired electric power plants where they are "co-fired" with coal. The large sheets may be cut into 2' x 2' x ¼" sheets or other desired sizes.
25 Plate heater also known as a plate heat exchanger that transfers heat energy to the moving heated belt to maintain a desired temperature.
27 Heat Transfer Fluid: HTF is circulated between a heater and plate heaters in a "closed" system. The heat energy from the HTF is used to heat the conveyor belting to the desired temperature that may be above 480 F. by conduction as the belting moves over the plate heater surface.
28 Heat Transfer Fluid: HTF is circulated between a heater and immersion vats in an "open" system. The heat energy from the HTF is used to heat the partially submerged metal chambers to the desired temperature that may be above 480 F. by conduction as the racked metal chambers with wood sheets is conveyed through the heating process.
30 PRE-HEAT: Immersion Vat with HTF at Pre-Heat Section. Metal chambers are partially submerged and conveyed where most of the moisture is driven out of the wood sheets.
31 TREATMENT: Immersion Vat with HTF at Heat Treatment Section. Metal chambers are partially submerged and conveyed where VOCs and other gasses are expelled and where the torrefication occurs in an oxygen free environment.
32 PRE-HEAT: Immersion Vat with HTF at Cooling Section. Metal chambers are partially submerged and conveyed where heat is removed from the wood to prevent combustion.
33 Air Cooling and Unloading Section: The torrefied wood in metal chambers is further air cooled by a fan and ambient air. The torrefied wood sheets are then unloaded from the metal chambers.
34 Metal chamber. This may be 3' wide by 5' high by ¼" inside depth chamber with an open top. The chamber can hold a 2' by 2' by ¼' thick wood sheet for conduction heating.

35 Metal chamber rack. This rack will contain a large number of chambers on one rack for suspension in HTF.
36 Clamp for pressing all chambers on a rack together to maintain direct contact of wood sheets and the metal sides of the chambers for maximum surface.
37 Lift rod: Shaped 3/16" diameter metal rod for removing 2' × 2' × 1/4" wood sheet from metal chamber.
38 Conveyor system: This may be a cable or chain conveyor to move the racked metal chambers through the immersion heating process.
39 Curtains - Maintains oxygen free zones. Supplemental nitrogen may be added.
40 Expelled gasses: Includes water vapor, gasses and volatile organic compounds (VOC's). Gasses being expelled from wood sheets due to conduction heating.
41 Expelled moisture in the form of steam from pre-heat section.
42 Expelled VOCs and other gasses from heat treatment section.
43 Exhaust conduit with an inlet having an exterior contour dimension and configured to snugly engage the slot shaped opening in-between be opposed parallel heated conveyor belts that heat the wood product.
44 Exhaust piping of expelled gasses to condenser, boiler and or exhaust.
45 Back draft damper for one way gas flow only.
46 Liquid, solid and gas forms of water, gasses or volatile organic compounds (VOC's) in wood.
47 Flue gas exhaust. This may include a heat exchanger or may be directed to an Apparatus for Cleaning Flue Gasses and other Gasses per my previous patent number 4,539,916 to preheat biomass prior.
50 Heater. In the Preferred form of the invention the heater uses torrefied wood pellets (TWP) as fuel to heat transfer fluid (HTF) that heats the plate heaters. Fossil fuel may also be used.
51 Storage Tanks for heat transfer fluid (HTF) with storage capacity to hold all heat transfer fluid (HTF) during emergency.
52 Circulating Pump System. Pumping system circulates heat transfer fluid (HTF) between the heat processing area and the heater. Includes filters, valves, controls and piping.
53 Train cars delivering wood pellets (WP) to torrification a processing facility to process into TWP.
54 Train cars delivering torrefied wood pellets (TWP) to electric power generation plant.
55 Train cars delivering torrefied wood pellets (TWP) for storage as Carbon Offsets.
56 Electric power generation plant.
57 Carbon dioxide generated from power plants, industry and transportation
58 TWP for carbon offsets and for long range storage
59 The suns energy.
60 Coal While the present invention has been described in terms of a process that first forms the biomass 11 into a thin sheet of wood followed by heat treatment, those skilled in the art will recognize that the biomass 11 may be formed into pellets after the treatment described herein without departing from the spirit of the present invention. However, it will be understood that the process of forming the biomass into a continuous thin sheet of wood increases the density of the biomass and thereby simplifies the handling of the biomass. In addition, as noted above thinner sheets of wood may be processed more rapidly than thicker sheets of wood.

An important aspect of the present invention is the utilization of conduction heat transfer to raise the temperature of the wood sufficiently to achieve torrefaction. It will be understood that the term conduction heat transfer refers to abstain shall surface contact between the wood and either the metal chamber 34 or at least one conveyor belt 21. It is this conduction this conduction that is an essential part of the present invention.

The heat transfer between the respective conveyor belts may be achieved in various embodiments with metal belts that that have intimate thermal contact with the wood to maximize conduction heat transfer. This is important to rapidly raise the temperature of the wood well above ambient temperatures. In the same manner the intimate thermal contact between the metal chamber 34 and the wood 15 exemplifies the substantial surface contact for conduction heating.

Similarly, the sheet cutting section 23 may be a knife edge cutter blade as shown in FIG. 6 that is used to chop 4'×8' sections from the planar wood product. In other embodiments the pellet cutting station 24 may include a rotary cutter as shown in FIG. 7 wherein a cylindrical cutter has radially extending blades that will cut transversely extending successive axial sections in addition to axially spaced planar cutters on the rotary cutter whereby each transversely extending section is cut at axially spaced parts thereof to form pellets. The description refers to the use of discrete spacers 29. Those skilled in the art will recognize that such spacers may be an integral part of the respective metal chambers 34.

The precise temperature to which the wood is raised to achieve torrefaction will vary with the precise composition of the biomass used to produce the wood sheet. Although representative temperatures have been stated herein, it will be understood that various compositions of the wood as well a local ambient conditions will vary the temperatures required. In the same manner some of the temperatures, such as the temperatures of the conveyor belt 21 may be varied as a function of how fast you want to complete the torrefaction. Thus, if a faster result is required or a shorter belt is used you would ordinarily increase the temperature of the belt in order to achieve the desired result.

The description herein has described only wood products that are heated by conduction, it will be understood that some embodiments of the present invention will include torrefied wood that contains the heat transfer fluid (HTF) of the applicant's prior patent application filed Dec. 31, 2006 and entitled Method and Apparatus for Biomass Torrefaction, Manufacturing a Storable Fuel from Biomass and Producing Offsets for the Combustion Products of Fossil Fuels and a Combustible Article of Manufacture.

Although the description above contains many specifics, these should not be construed as than limiting the scope of the invention, but as merely providing illustrations of some of the presently preferred embodiments of this invention. Thus, the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

I claim:

1. A method for torrefaction of wood which comprises:
providing a first endless conveyor belt and apparatus for mounting the first endless belt on respective rollers;
heating the first endless belt; and
positioning a planar wood product on the first belt to heat the wood product by conduction to achieve torrefaction.

2. The method as described in claim 1 further including:
providing a second endless belt;
heating the second endless belt; and
positioning at least a first axial portion of the second belt proximate to at least a first axial portion of the first endless belt, whereby a wood product may be moved intermediate the respective first axial portions to achieve torrefaction of the wood.

3. The method as described in claim 1 wherein:
the step of providing a first endless conveyor belt includes providing a metal conveyor belt to maximize heat transfer.

4. The method as described in claim 1 further including:
providing first and second opposed metal conveyor belts dimensioned and configured to simultaneously contact opposed sides of the wood product to maximize heat transfer.

5. The method as described in claim 1 further including:
sequentially providing pre-heat, heating and cooling sections for sequentially heating and cooling a wood product.

6. The method as described in claim 1 further including:
sequentially providing pre-heat, heating and cooling sections for sequentially heating and cooling a wood product followed by providing a cutting section disposed after the cooling section.

7. The method as described in claim 6 further including:
wherein the step of providing a cutting section includes providing a cutting section that cuts sequential transverse sections of a planar wood product.

8. The method as described in claim 6 further including:
wherein the step of providing a cutting section includes providing a cutting section that cuts both sequential transverse sections of a planar wood product as well as axial parts of each transverse section to produce pellets.

9. The method as described in claim 1 further including:
the step of providing a first endless conveyor belt includes providing a belt that has axially extending edges that are not uniform whereby gasses escaping from a planar wood product may pass more easily.

10. The method as described in claim 4 further including:
providing an enclosure having an outlet surrounding the first and second opposed metal conveyor belts dimensioned and configured to contact opposed sides of the wood product whereby the gasses escaping from the heated wood product can be directed from the wood product.

11. The method as described in claim 1 further including:
the step of providing apparatus to form wood pulp into sheets proximate to the endless belt.

12. The method as described in claim 4 further including:
the step of providing an exhaust conduit having an exterior contour dimensioned and configured to snugly engage a space intermediate opposed conveyor belts that are positioned for heat transfer relationship with opposed sides of single wood sheets.

13. The method as described in claim 1 wherein the step of heating the first endless belt to thereby heat the wood product is achieved by heating the endless belt to a temperature in excess of 450° F.

14. The method as described in claim 1 wherein the step of heating the first endless belt to thereby heat the wood product is achieved by heating the endless belt to a temperature in excess of 480° F.

15. The method as described in claim 1 wherein the step of heating the first endless belt is sufficient to heat the wood to a temperature of 480° F.

16. A method for torrefaction of wood which comprises:
providing a wood sheet having opposed generally planar substantially parallel opposed sides;
providing a metal chamber having opposed planar sides dimensioned and configured for receiving the wood sheet with the respective opposed sides of the wood sheet in intimate thermal contact heat transfer relationship with respective opposed sides of the metal chamber when the wood is placed in the metal chamber;
positioning the wood sheet within the metal chamber with intimate thermal contact between the planar sides of the wood sheet and the respective opposed planar sides of the metal container;
immersing the metal chamber in a heat exchange liquid: and
heating the wood by conduction heat transfer between the metal chamber and the wood sheet to a temperature of at least 400° F.

17. The method as described in claim 16 further including the step of providing an ejection structure for removing the wood sheet from the metal chamber.

18. The method as described in claim 17 further including:
providing a plurality of additional wood sheets having opposed generally planar substantially parallel opposed sides;
providing a respective metal chambers for each of the plurality of additional wood sheets each having opposed planar sides dimensioned and configured for receiving the wood sheet with the respective opposed sides of the wood sheet in intimate thermal contact heat transfer relationship with respective opposed sides of the metal chamber when the wood is placed in the metal chamber;

positioning each additional wood sheet within a respective metal chamber with intimate thermal contact between the planar sides of each of the wood sheets and the opposed planar sides of a respective metal container;

immersing the metal chamber in a heat exchange liquid; and heating the wood by conduction heat transfer between the metal chamber and the wood sheet to a temperature of at least 400° F.

19. The method as described in claim 18 further including providing a rack for receiving a plurality of metal chambers.

20. The method as described in claim 19 further including providing clamping apparatus for clamping the plurality of metal chambers together and clamping the plurality of metal chambers within a rack together.

21. The method as described in claim 20 further including positioning spacers intermediate adjacent metal chambers before the clamping step.

22. The method as described in claim 1 further including the step of condensing and capturing volatile organic compounds released incident to heating the wood product.

\* \* \* \* \*